(12) United States Patent
Mcguinness et al.

(10) Patent No.: US 10,874,065 B2
(45) Date of Patent: Dec. 29, 2020

(54) VERTICAL HYDROPONICS SYSTEMS

(71) Applicant: Green Thumb Technology Inc., Powell River (CA)

(72) Inventors: Jennifer Mcguinness, Powell River (CA); Matthew Mei, Vancouver (CA)

(73) Assignee: Green Thumb Technology Inc., Powell River (CA)

( * ) Notice: Subject to any disclaimer, the term of this patent is extended or adjusted under 35 U.S.C. 154(b) by 116 days.

(21) Appl. No.: 15/719,052

(22) Filed: Sep. 28, 2017

(65) Prior Publication Data

US 2018/0092314 A1    Apr. 5, 2018

Related U.S. Application Data

(60) Provisional application No. 62/403,539, filed on Oct. 3, 2016.

(51) Int. Cl.
*A01G 31/06* (2006.01)
*A01G 9/02* (2018.01)
(Continued)

(52) U.S. Cl.
CPC .............. *A01G 31/06* (2013.01); *A01G 9/023* (2013.01); *A01G 27/005* (2013.01); *A01G 7/045* (2013.01);
(Continued)

(58) Field of Classification Search
CPC ........ A01G 31/00; A01G 31/06; A01G 31/02; A01G 9/022; A01G 9/023; A01G 9/025;
(Continued)

(56) References Cited

U.S. PATENT DOCUMENTS

| 2,930,162 | A | * | 3/1960 | Mulford | .................. | B65D 1/30 |
| | | | | | | 47/78 |
| 3,819,118 | A | | 6/1974 | Brock et al. | | |

(Continued)

FOREIGN PATENT DOCUMENTS

| CA | 2228071 A1 | 1/1998 |
| CA | 2642183 A1 | 4/2010 |

(Continued)

OTHER PUBLICATIONS http://ucanr.edu/sites/scmg/2010_Feature_Articles/Vertical_Gardens_978/, printed Dec. 18, 2017.

(Continued)

*Primary Examiner* — Christopher D Hutchens
(74) *Attorney, Agent, or Firm* — Oyen Wiggs Green & Mutala LLP

(57) ABSTRACT

A vertical hydroponics system is provided. The flow rate or pressure of the solution passing through the system is uniform throughout the system to reduce or prevent clogging and/or leaking. The diameters of the various components of the system's water supply plumbing are such so as to reduce or prevent clogging and/or leaking. The vertical hydroponics system includes at least one body, at least one pot coupled to a front surface of the at least one body for supporting one or more plants, and a water source fluidly connected to each body for delivering water uniformly to each pot. Each body is configured to direct water away from the front surface of the body to reduce or prevent leaking. Accordingly, flow rates or pressures not typically associated with vertical hydroponics systems may be used to deliver water to the pot(s).

21 Claims, 23 Drawing Sheets

(51) Int. Cl.
*A01G 27/00* (2006.01)
*A01G 7/04* (2006.01)
*A01G 31/00* (2018.01)

(52) U.S. Cl.
CPC ......... *A01G 2031/006* (2013.01); *Y02P 60/21* (2015.11)

(58) Field of Classification Search
CPC .................. A01G 27/005; A01G 7/045; A01G 2031/006; A01G 9/028; A01G 27/008; A01G 25/02
USPC ........................... 47/39, 60, 63, 62 R, 82, 83
See application file for complete search history.

(56) References Cited

U.S. PATENT DOCUMENTS

| | | | |
|---|---|---|---|
| 4,058,257 A | 11/1977 | Spencer | |
| 4,177,604 A | 12/1979 | Friesen | |
| 4,295,296 A | 10/1981 | Kinghorn | |
| 4,684,013 A * | 8/1987 | Jacobs | A01G 9/028 206/423 |
| 4,961,284 A | 10/1990 | Williams | |
| 5,383,601 A | 1/1995 | Astle | |
| 5,440,836 A * | 8/1995 | Lee | A01G 31/06 47/59 R |
| 5,502,923 A * | 4/1996 | Bradshaw | A01G 31/06 47/62 A |
| 5,555,676 A * | 9/1996 | Lund | A01G 9/022 47/82 |
| 6,023,883 A | 2/2000 | Bacon | |
| 6,219,963 B1 | 4/2001 | Wang | |
| 6,405,482 B1 | 6/2002 | Skaife | |
| 6,615,542 B2 * | 9/2003 | Ware | A01G 31/02 47/83 |
| 8,181,391 B1 | 5/2012 | Giacomantonio | |
| 8,516,743 B1 | 8/2013 | Giacomantonio | |
| 8,578,651 B1 | 11/2013 | Giacomantonio | |
| 8,950,112 B2 * | 2/2015 | dos Santos | A01G 9/025 47/82 |
| 2002/0084346 A1 * | 7/2002 | Katzman | A01G 9/022 239/17 |
| 2002/0125362 A1 | 9/2002 | Bryant | |
| 2006/0032128 A1 * | 2/2006 | Bryan, III | A01G 31/06 47/62 R |
| 2007/0144069 A1 | 6/2007 | Gottlieb et al. | |
| 2007/0194149 A1 | 8/2007 | Mavrakis et al. | |
| 2009/0007486 A1 | 1/2009 | Corradi | |
| 2009/0255180 A1 * | 10/2009 | Felknor | A01C 23/042 47/62 N |
| 2009/0307973 A1 | 12/2009 | Adams et al. | |
| 2010/0146855 A1 * | 6/2010 | Ma | A01G 9/025 47/82 |
| 2011/0059518 A1 | 3/2011 | Bribach et al. | |
| 2011/0258925 A1 * | 10/2011 | Baker | A01G 9/023 47/65.8 |
| 2011/0258927 A1 | 10/2011 | Carter et al. | |
| 2013/0074408 A1 | 3/2013 | Singh | |
| 2013/0160363 A1 | 6/2013 | Whitney et al. | |
| 2015/0313104 A1 * | 11/2015 | Cottrell | A01G 9/022 47/62 A |
| 2018/0014484 A1 * | 1/2018 | Yoshida | A01G 31/02 |
| 2019/0166778 A1 * | 6/2019 | Hendrick | A01G 31/06 |

FOREIGN PATENT DOCUMENTS

| | | |
|---|---|---|
| EP | 872172 A1 | 10/1998 |
| EP | 1403025 A1 | 3/2004 |
| EP | 2116129 A1 | 11/2009 |
| EP | 2189057 A1 | 5/2010 |
| EP | 2227942 A1 | 9/2010 |
| IL | 124704 A | 1/1999 |
| JP | 05192046 A | 8/1993 |
| RU | 126892 U1 | 4/2013 |
| WO | 2002074444 A2 | 9/2002 |
| WO | 2005055700 A3 | 6/2005 |
| WO | 2010054450 A1 | 5/2010 |
| WO | 2012038766 A2 | 3/2012 |

OTHER PUBLICATIONS http://www.sciencedirect.com/science/article/pii/S0360132313002382, printed Dec. 18, 2017.
Ottele, Marc, et al. "Comparative life cycle analysis for green facades and living wall systems," www.sciencedirect.com/science/article/pii/S0378778811003987, Dec. 2011.
Perini, Katia, et al. "Vertical greening systems and the effect on air flow and temperature on the building envelope," www.sciencedirect.com/science/article/pii/S036013231100148X, Nov. 2011.
Ismail, Mostafa Refat, "Quiet environment: Accoustics of vertical green wall systems of the Islamic urban form," www.sciencedirect.com/science/article/pii/S2095263513000174, Jun. 2013.
Perry, Leonard, "Grow Vertical Vegetables," http://pss.uvm.edu/ppp/articles/vertgard.html, printed Dec. 18, 2017.
http://aces.nmsu.edu/ces/yard/2005/021205.html, printed Dec. 18, 2017.
Grisso, Robert, et al. "Assistive Technologies in Agriculture," http://pubs.ext.vt.edu/442/442-084/442-084.html, Dec. 3, 2014.

* cited by examiner

VERTICAL HYDROPONICS SYSTEMS

TECHNICAL FIELD

This application relates to vertical hydroponics systems. Example embodiments provide vertical hydroponics systems that are modular and horizontally and/or vertically stackable.

BACKGROUND

Hydroponics is a method of growing plants in the absence of soil, using aqueous mineral and/or nutrient solutions. Terrestrial plants are supported by their roots in an inert medium (such as clay pellets, rock wool, glass beads, recycled glass, perlite, peat moss, vermiculite, gravel, and/or the like). Mineral and/or nutrient-rich water is provided to the plants via a pump and tubing. Hydroponics systems fall into one of two categories: vertical systems or horizontal systems.

Vertical hydroponics systems rely on a slow release of water to prevent water from leaking out of the system. Examples of such vertical systems include drip irrigation systems, spray irrigation systems, and wick systems. FIG. 1 illustrates a prior art drip or spray irrigation system 10. Aqueous solution is pumped from a reservoir 12 through irrigation tube 14 to at least one vertical stack 16 of plant pots. Irrigation tube 14 branches into drippers or sprayers 18 that feed each stack 16. Drip irrigation systems and spray irrigation systems, such as the one illustrated in FIG. 1, have components that easily clog with use. For example, the flow rate or pressure of aqueous solution through drip and spray irrigation systems can vary. For example, the flow rate or pressure of solution at drippers/sprayers 18 nearest pump 11 is greater than the flow rate or pressure at drippers/sprayers 18 further away from pump 11. Due to the reduced flow rate or pressure, drippers/sprayers 18 further away from pump 11 are prone to clogging. The aqueous solution used by drip and spray irrigation systems is mineral and/or nutrient-rich and supports microbial growth. If not replaced regularly, the aqueous solution becomes 'slimy' and clogs the pipes, drippers, and/or sprayers of these systems. Even where the pump is fit with a filter to screen slimy build-up, minerals in the aqueous solution will pass through the filter and can build-up within the pipes, drippers, and/or sprayers, thereby clogging drip and spray irrigation systems. Since hydroponics systems lack soil for water retention, such systems require a reliable water source. If parts clog, plants are denied water and can die unless an operator detects that a plant is in distress. Enhancing water flow or pressure (for example, by increasing the diameter of the pipes) to address clogging issues is typically ineffective since clogging is attributable to the small diameters of conventional drippers and/or sprayers. Further, since hydroponics systems lack soil for water retention, enhancing water flow or pressure can lead to flooding, which is especially undesirable for indoor hydroponics systems. Accordingly, drip and spray irrigation systems must be regularly maintained by replacing the aqueous solution with fresh solution and by replacing or cleaning clogged parts.

Some horizontal hydroponics systems suffer from similar clogging issues as vertical hydroponics systems. FIG. 2 illustrates a prior art drip irrigation system 20. Aqueous solution is pumped from a reservoir 22 through irrigation tube 24 to at least one plant 26 using a pump 21. Irrigation tube 24 branches into drippers 28 that feed each plant 26 (or rows of plants 26). FIG. 3 illustrates a prior art spray irrigation system 30. Many features and components of spray irrigation system 30 are similar to features and components of drip irrigation system 20; however, spray irrigation system 30 uses sprayers 38 in place of drippers 28 to feed plants 36 (or rows of plants 36) with aqueous solution from a reservoir 32 via pump 31. Such systems are often referred to as aeroponics systems on account of sprayers 38 oxygenating the aqueous solution in reservoir 32. Drip irrigation systems and spray irrigation systems, such as those illustrated in FIGS. 2 and 3, have components that easily clog with use. For example, with reference to FIG. 2, leaves and other parts of plants 26 fall into plant support basin 27 and clog drain 29 therein. Unless pump 21 is deactivated, aqueous solution from reservoir 22 will flood basin 27 causing solution to leak from system 20. The flow rate or pressure of aqueous solution through drip and spray irrigation systems can also vary. Due to reduced flow rates or pressures, as described elsewhere herein, drippers 28 and sprayers 38 further away from pumps 21 and 31, respectively, are prone to clogging. If the aqueous solution used by such drip and spray irrigation systems is not replaced regularly, the solution clogs the pipes, drippers, and/or sprayers of these systems.

In typical horizontal systems, such as the ebb and flood system, the nutrient film technique system, and the deep water culture system, the diameter of the plumbing used to supply plants with water is typically larger than the diameter of the plumbing (e.g. drippers and/or sprayers) used by typical vertical hydroponics system. Such horizontal hydroponics systems are able to address some of the clogging issues faced by conventional vertical systems by increasing the flow or pressure of aqueous solution therethrough. FIG. 4 illustrates a prior art ebb and flood system 40. A pump 41 pumps aqueous solution from a reservoir 42 to a basin 47 via a pipe 44 to soak the roots of plants 46. An overflow drain 49 returns aqueous solution to reservoir 42 when basin 47 is flooded with a predetermined volume of water. FIG. 5 illustrates a prior art nutrient flow technique system 50. Aqueous solution is constantly supplied from reservoir 52 to plants 56 sitting in basin 57 via pump 51 and pipe 54. Basin 57 is inclined such that aqueous solution provided at the elevated end flows through the roots of plants 56 as it travels towards the lower end and drain 59. FIG. 6 illustrates a prior art water culture system 60. The roots of plants 66 are suspended in an aqueous solution inside a reservoir 62. An air pump 61 is used to oxygenate the aqueous solution. Wick systems can be vertical or horizontal. FIG. 7 illustrates a prior art horizontal wick system 70. A moisture absorbent material 75 is contained in a basin 77 and an aqueous solution inside a reservoir 72 is wicked to plants 76 via wicks 73. An air pump 71 may be used to oxygenate the aqueous solution inside reservoir 72. Plants requiring large amounts of water will deplete basin 77 before wicks 73 are able to replenish basin 77 with water. Plants that are denied water will quickly die unless an operator detects that a plant is in distress. Also, materials detrimental to plant health and growth can accumulate in the moisture absorbent material 75. While horizontal systems are able to alleviate some of the clogging issues faced by vertical systems, horizontal systems typically have a larger footprint and take up considerably more space than vertical systems. Horizontal systems occupy floor, table-top, and countertop space, whereas vertical systems can be suspended from a surface above, mounted to a wall or other vertical surface, or mounted in a stand. Further, many horizontal systems, such as those illustrated in FIGS. 4 and 5, have components that easily clog with use. For example, leaves and other parts of plants 46, 56 fall into plant support basins 47, 57 and clog drains 49, 59 therein. Unless pumps 41, 51 are deactivated, aqueous solution from reservoirs 42, 52 will flood basins 47, 57 causing solution to leak from systems 40, 50.

There is a general desire for hydroponics systems that address and/or ameliorate at least some of the aforementioned problems, or otherwise reduce clogging and/or leaking, while occupying a smaller footprint than conventional horizontal systems.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a vertical hydroponics system including at least one body, at least one pot coupled to a front surface of the at least one body for supporting one or more plants, and a water source fluidly connected to each body for delivering water uniformly to each pot. Each body is configured to direct water away from the front surface of the body to reduce or prevent leaking.

In some embodiments, the body is configured such that water flows only through a lower portion of each pot.

In some embodiments, the lower portion of each pot is the lower half in height or volume of the pot.

In some embodiments, the lower portion of each pot is the lower third in height or volume of the pot.

In some embodiments, each body includes one or more paddles. Each paddle extends inwardly from an inside surface of the body and is configured to direct water away from the front surface of the body to reduce leaking.

In some embodiments, each body comprises at least one tier.

In some embodiments, each tier is V-shaped and includes a front surface attached to a rear surface by two side surfaces. The front surface has an upper surface adjoined to a lower surface at an angel $\alpha$. The rear surface has an upper surface adjoined to a lower surface at an angle $\beta$.

In some embodiments, the angle $\alpha$ is between about 30° to about 60°.

In some embodiments, the angle $\alpha$ is about 45°.

In some embodiments, the angle $\beta$ is between about 30° to about 60°.

In some embodiments, the angle $\beta$ is about 45°.

In some embodiments, the water source comprises a lower reservoir removeably attachable to a lower end of each lowermost body.

In some embodiments, the water source comprises a preexisting plumbing or water system.

In some embodiments, the system includes at least one irrigation tube extending from the water source to a rear, upper surface of the body.

In some embodiments, at least one apertures is defined in the irrigation tube. Each aperture is aligned to deliver water from the rear, upper surface of the body to a column of pots.

In some embodiments, the irrigation tube splits into two or more supply tubes at an end thereof. Each tube is aligned to deliver water from the rear, upper surface of the body to a column of pots.

In some embodiments, the water source comprises an upper reservoir removeably attachable to an upper end of each body.

In some embodiments, the system includes an irrigation tube for delivering water from the lower reservoir to the upper reservoir.

In some embodiments, at least one apertures is defined in the upper reservoir. Each aperture aligned to deliver water from the rear, upper surface of the body to a column of pots.

In some embodiments, a plurality of apertures is defined in each pot for allowing water to travel through the pots.

In some embodiments, the apertures of each pot are sized so as to retain an inert medium in the pot.

In some embodiments, each body is vertically-stackable and/or horizontally-stackable.

In some embodiments, the system includes a removable lid to close the system.

In some embodiments, the system includes a pump for delivering water uniformly to each pot from the water source.

In some embodiments, the system includes a controller for manually or automatically programming the pump.

In some embodiments, the system includes at least one light.

In some embodiments, the controller manually or automatically programs the at least one light.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Figure 1:
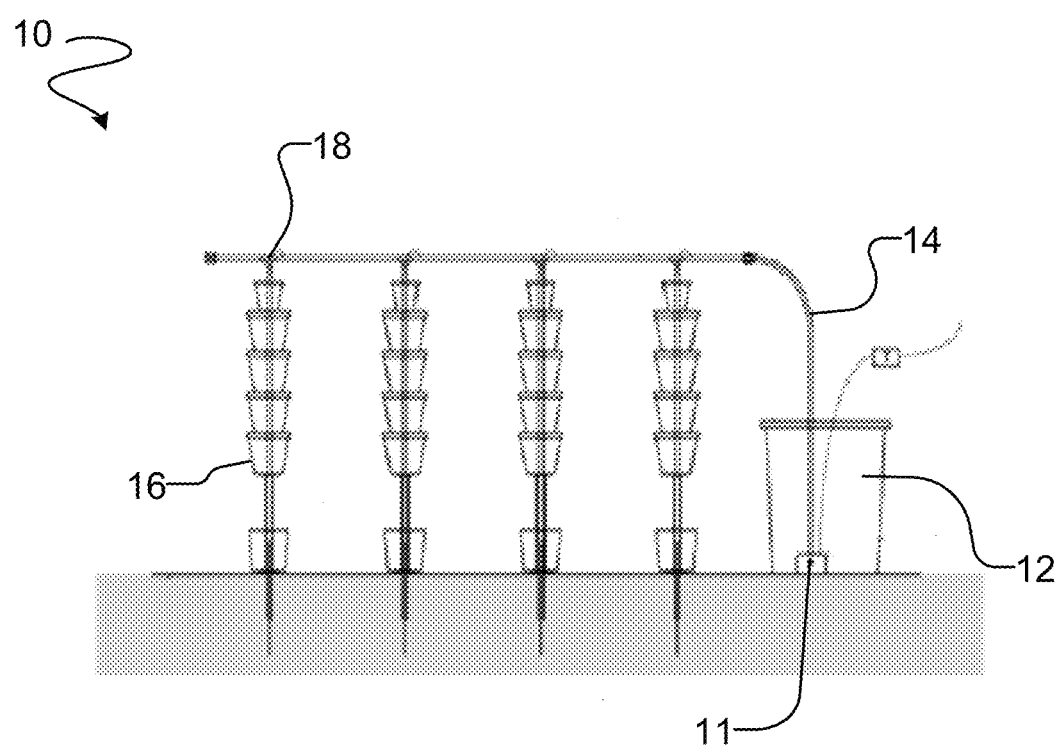
FIG. 1 is a prior art vertical drip or spray irrigation hydroponics system.
Figure 2:
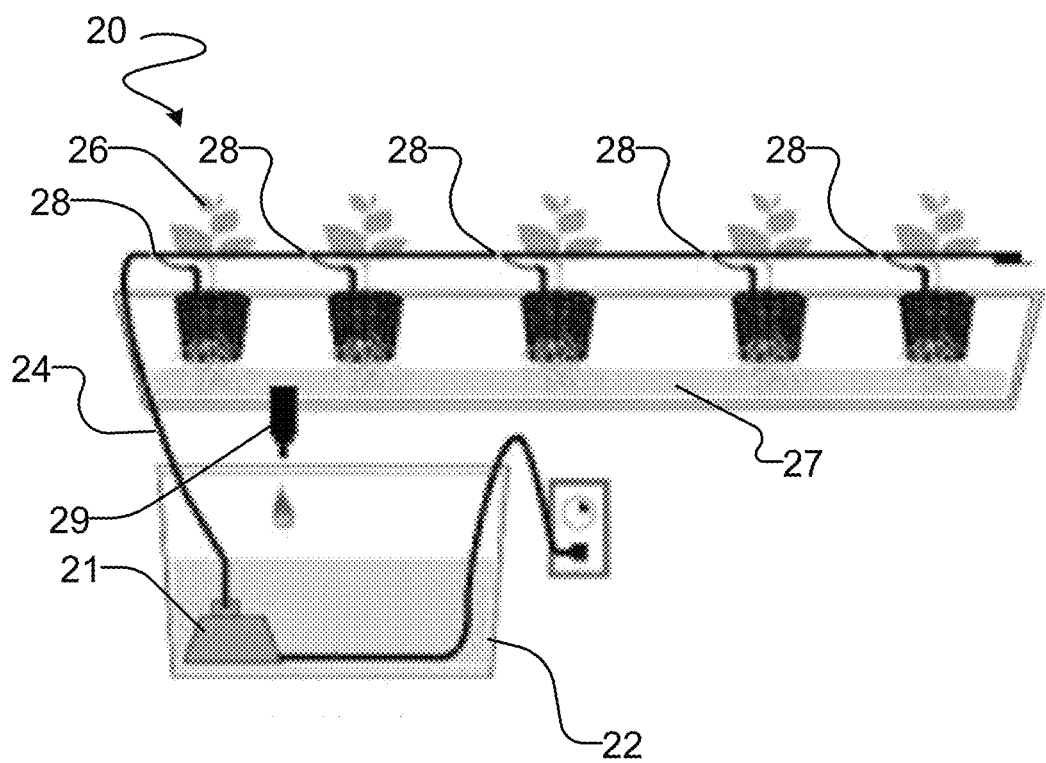
FIG. 2 is a prior art horizontal drip irrigation hydroponics system.
Figure 3:
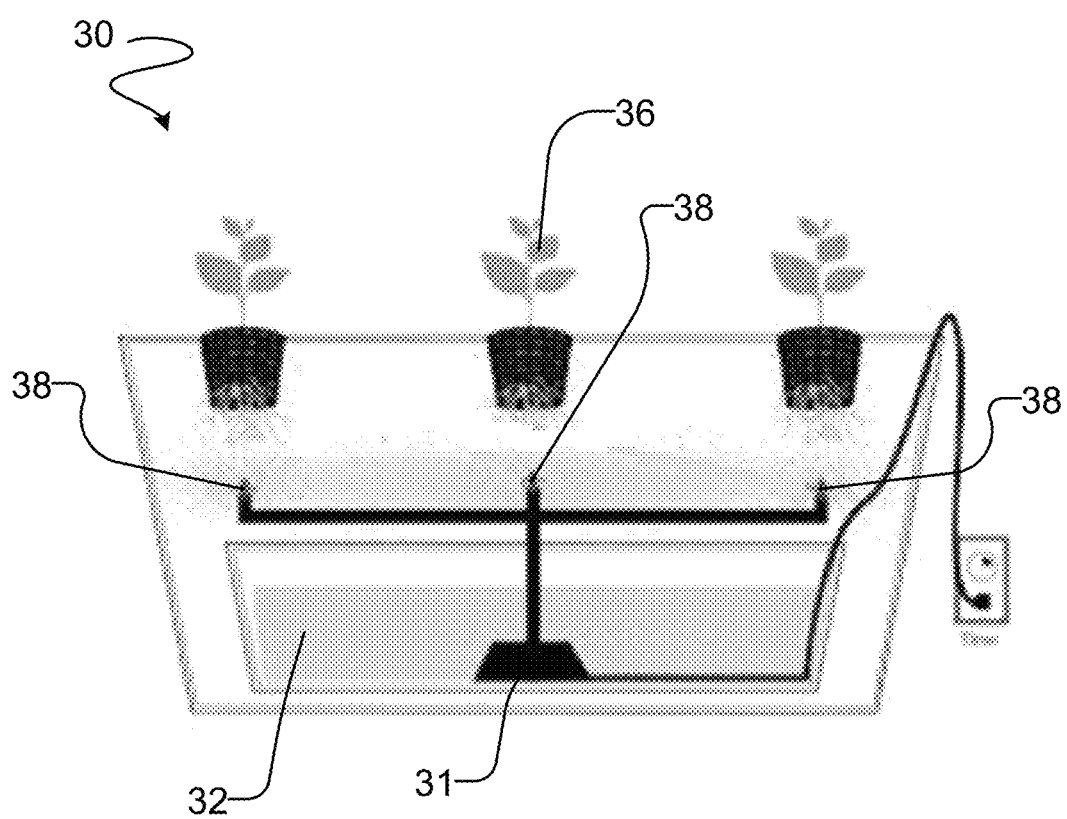
FIG. 3 is a prior art horizontal spray irrigation hydroponics system.
Figure 4:
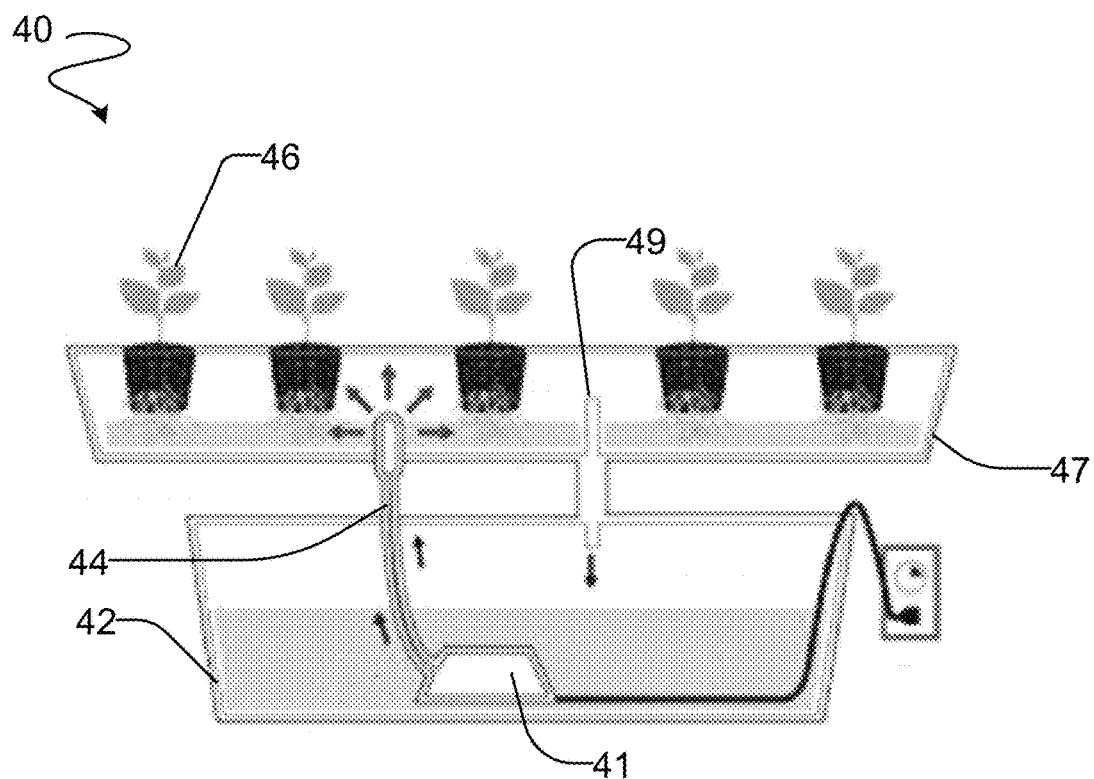
FIG. 4 is a prior art horizontal ebb and flood hydroponics system.
Figure 5:
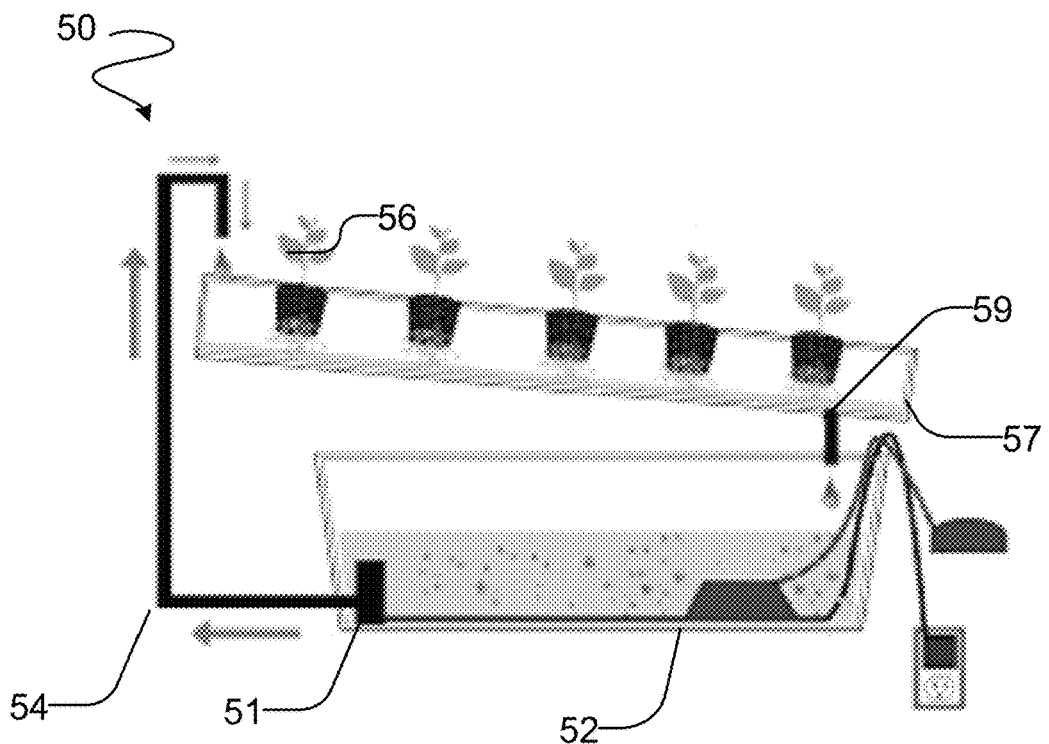
FIG. 5 is a prior art horizontal nutrient flow technique hydroponics system.
Figure 6:
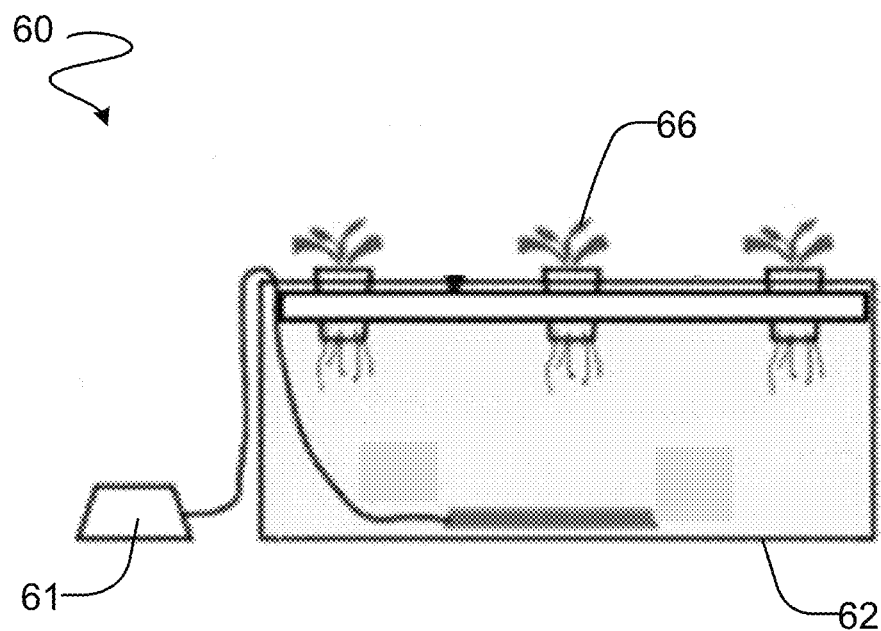
FIG. 6 is a prior art horizontal water culture hydroponics systems.
Figure 7:
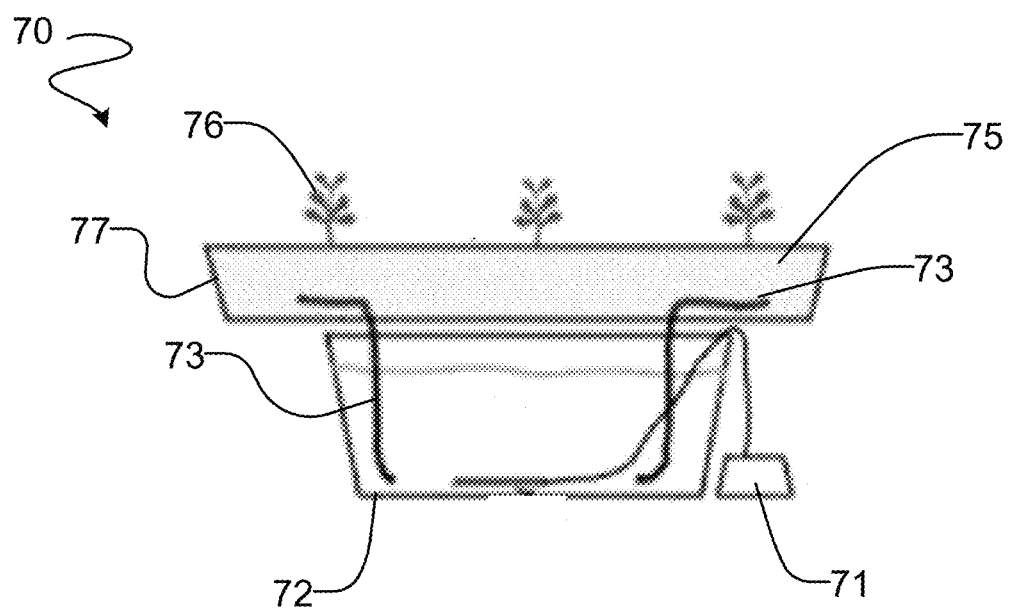
FIG. 7 is a prior art horizontal wick hydroponics systems.

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Unless the context dictates otherwise, "water" (as used herein) refers to an aqueous solution, including, but not limited to, a mineral and/or nutrient-rich aqueous solution used to support plant growth and health.

Unless the context dictates otherwise, "plant" (as used herein) refers to any terrestrial member of the kingdom Plantae that intakes water and inorganic substances to synthesize nutrients by the process of photosynthesis. Examples of plants include, but are not limited to, trees, shrubs, herbs, grasses, ferns, flowers, fruits, vegetables, and mosses.

Unless the context dictates otherwise, "vertical" (as used herein) refers to a direction that is substantially perpendicular to the horizon, or otherwise at a right angle to horizontal.

Unless the context dictates otherwise, "horizontal" (as used herein) refers to a direction that is substantially parallel to the horizon, or otherwise at a right angle to vertical.

Unless the context dictates otherwise, "upper", "uppermost", and/or the like (as used herein) in relation to the vertical hydroponics systems and components thereof disclosed herein refer to a position that is situated above a corresponding position.

Unless the context dictates otherwise, "lower", "lowermost", and/or the like (as used herein) in relation to the vertical hydroponics systems and components thereof disclosed herein refer to a position that is situated below a corresponding position.

Unless the context dictates otherwise, "inward", "inwardly", and/or the like (as used herein) in relation to the vertical hydroponics systems and components thereof disclosed herein refer to directions that extend towards an inside thereof.

Unless the context dictates otherwise, "outward", "outwardly", and/or the like (as used herein) in relation to the vertical hydroponics systems and components thereof disclosed herein refer to directions that extend away from an inside thereof.

Unless the context dictates otherwise, "about" (as used herein) means±5%.

Some embodiments of the present invention provide a hydroponics system. The flow rate or pressure of the solution passing through the system is uniform throughout the system to reduce or prevent clogging and/or leaking. The diameters of the various components of the system's water supply plumbing are such so as to reduce or prevent clogging and/or leaking. The hydroponics system includes at least one body, at least one pot coupled to a front surface of the at least one body for supporting one or more plants, and a water source fluidly connected to each body for delivering water uniformly to each pot. Each body is configured to direct water away from the front surface of the body to reduce or prevent leaking. Accordingly, flow rates or pressures not typically associated with vertical hydroponics systems may be used to deliver water to the pot(s).

Figure 11:
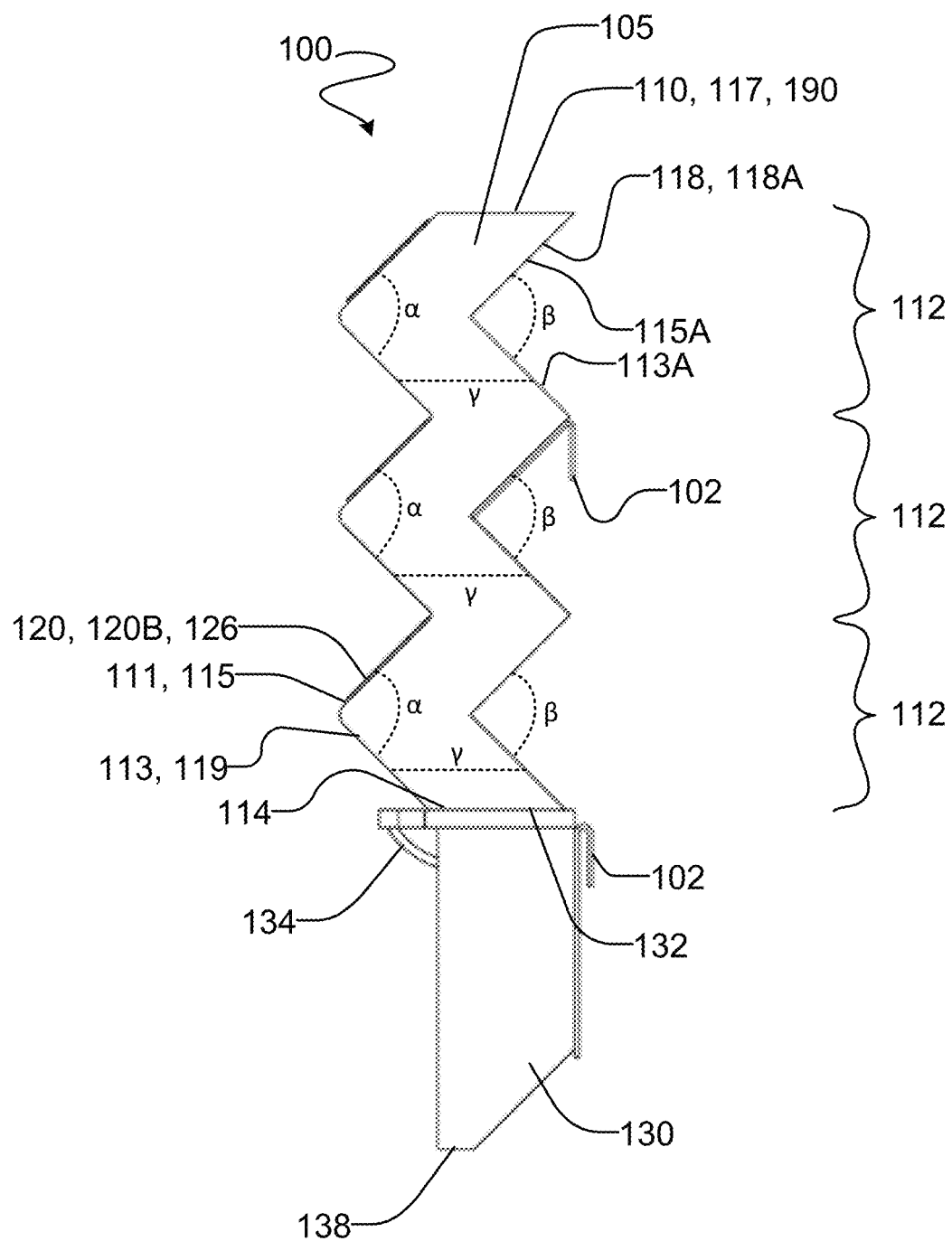
FIG. 11 is a right side elevation view of the FIG. 8 vertical hydroponics system.

A vertical hydroponics system 100 in accordance with one example embodiment of the present invention is shown in FIGS. 8 to 14. System 100 may be suspended from a surface above, mounted to a wall or other substantially vertical surface, and/or mounted in a stand. In some embodiments, a rear surface 118 and/or a rear surface 131 of reservoir 130 includes a hook 102 for mounting system 100 to an above surface, a wall, and/or another substantially vertical surface. System 100 comprises a body 110 for supporting at least one plant (not shown). In some embodiments, body 110 is tiered. In the illustrated embodiment, body 110 is three-tiered and each tier 112 comprises two pots 120 for supporting plants, although this is not necessary. Persons skilled in the art will recognize that body 110 may practically include any number of tiers and each tier 112 may include one or more pots 120. Some tiers 112 (but not all tiers 112) of body 110 may not have any pots 120 at all. In the illustrated embodiment, as best seen in FIG. 11, each tier 112 includes a V-shaped front surface 111 comprising an upper surface 115 connected to a lower surface 113 and V-shaped rear surface 118A comprising an upper surface 115A connected to a lower surface 113A. Front surface 111 and rear surface 118A are adjoined via sides 105. Front surface 111 is spaced apart from rear surface 118 by a horizontal distance γ. An angle α is defined between upper surface 115 and lower surface 113. An angle β is defined between upper surface 115A and lower surface 113A. In the illustrated embodiment, angle α and angle β are substantially equivalent, although this is not necessary. In some embodiments, angle α and/or angle β is between about 30° to about 60°. In some embodiments, angle α and/or angle β is about 45°. Persons skilled in the art will recognize that angle α and/or angle β may differ between tiers 112. Distance γ may depend on the size of plants supported by body 110.

Pots 120 are configured to support one or more plants in the absence of soil using an inert medium (not shown), including, but not limited to, one or more of clay pellets, rock wool, glass beads, recycled glass, perlite, peat moss, vermiculite, and gravel. The inert medium holds the roots of the plant and supports the plant(s) in pots 120. In some embodiments, one or more plants are suspended in water in pots 120. In the FIG. 8 embodiment, pots 120 are cylindrical to maximize the flow of water through apertures 122 defined by an inner surface 121 of pots 120. However, pots 120 can have any geometric shape. For example, pots 120 can have a rectangular or polygonal cross-section.

Apertures 122 are sized and shaped to minimize the inert medium from leaking inside body 110 and/or to allow water to travel through pots 120 to feed the plants inside. In some embodiments, pots 120 are lined with screening and/or mesh to allow water to reach the roots of the plant(s) inside pots 120, but minimize the inert medium and plant matter inside pots 120 from escaping into body 110. In this way, the inert medium and plant matter (including, but not limited to, leaves, flowers, petals, and seeds) cannot enter body 110 and/or clog system 100. The amount of plant matter entering body 110 and/or clogging system 100 is further minimized by providing one or more plants in each pot 120.

Pots 120 extend inwardly from upper surface 115 of tiers 112 towards the inside of body 110. Vertically-stacked pots 120 define columns in body 110 for water flow therethrough. In the FIG. 8 embodiment, a plurality of vertically-stacked pots 120A define a first column and a plurality of vertically-stacked pots 120B define a second column. Water cascades through tiered body 110 in a serpentine path through pots 120A of the first column and/or through pots 120B of the second column as described elsewhere herein.

Figure 12:
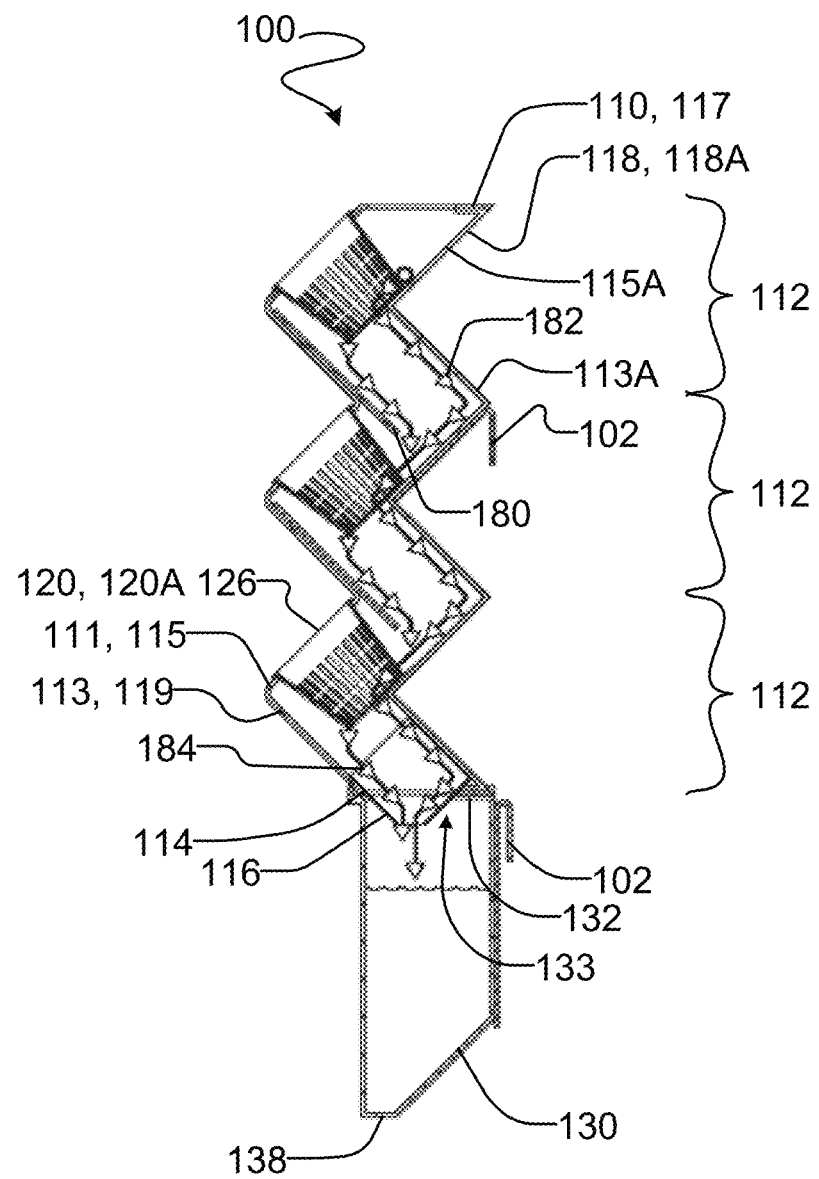
FIG. 12 is a cross-sectional view of the FIG. 8 vertical hydroponics system along the line designated as 100A in FIG. 9.
Figure 13:
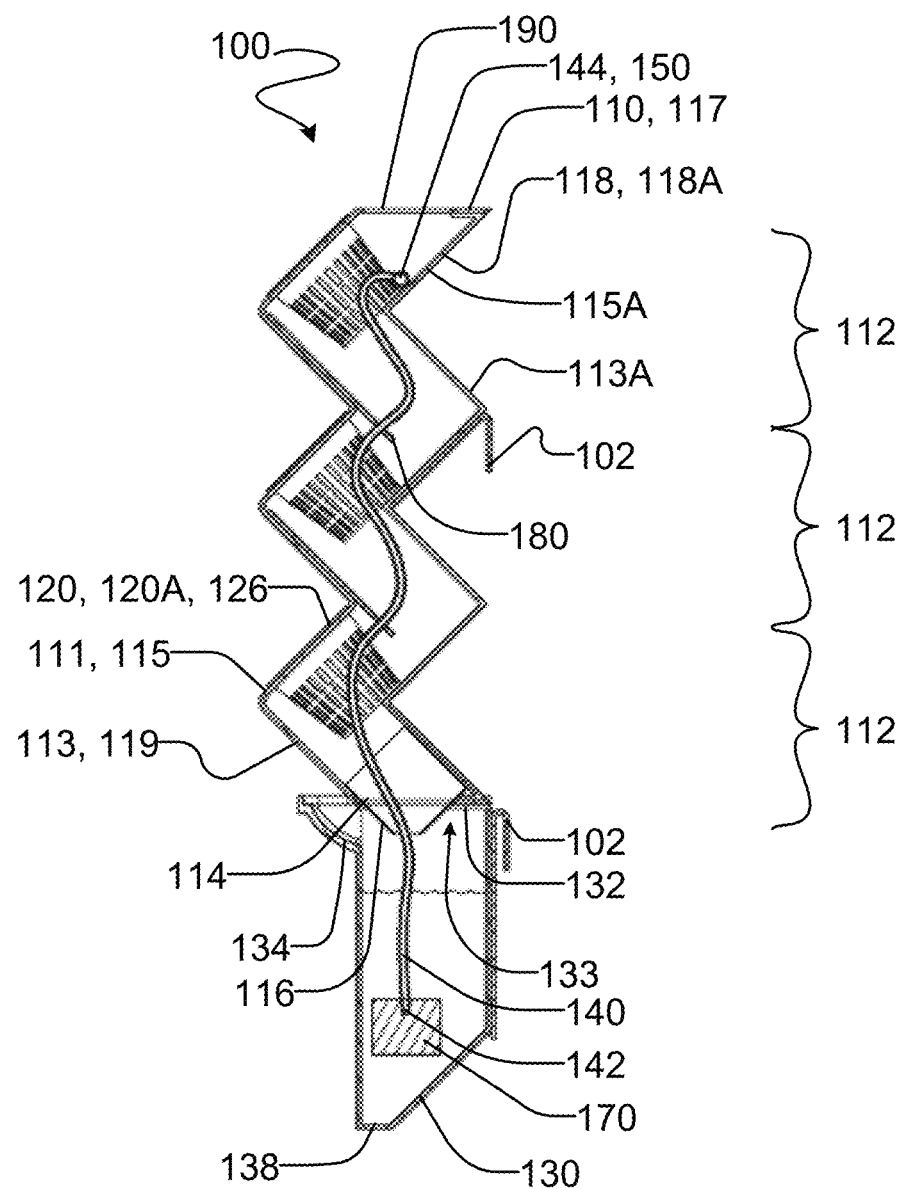
FIG. 13 is a cross-sectional view of the FIG. 8 vertical hydroponics system along the line designated as 100B in FIG. 9.

To supply the plants in pots 120 with water, in some embodiments, body 110 is removeably attachable to a reservoir 130. However, this is not necessary, and persons skilled in the art will recognize that in other embodiments, system 100 may be fluidly connected to existing plumbing/water systems for supplying water to and/or draining water from system 100. Where system 100 uses an existing plumbing/water system, system 100 may include a trough (not shown) to catch water flowing through system 100 and deliver water to the plumbing/water system. Where system 100 includes reservoir 130, a lower end 114 of body 110 is removeably attached to an upper end 132 of reservoir 130. To attach body 110 to reservoir 130, lower end 114 of body 110 may include a flange 116 projecting downwardly therefrom, as best seen in FIGS. 12 and 13. Flange 116 is configured to sit inside an opening 133 at upper end 132 of reservoir 130 and abut against upper end 132. In some embodiments, a seal (not shown) is provided between lower end 114 of body 110 and upper end 132 of reservoir 130 to fluidly seal body 110 and reservoir 130 together. Flange 116 is hollow and extends downwardly from lower end 114 to reduce the ability of water to leak from system 100 between body 110 and reservoir 130. In some embodiments, flange 116 tapers from lower end 114 of body 110 as flange 116 extends downwardly from body 110. In this way, water travels from body 110 to reservoir 130 through flange 116 without leaking. In the FIGS. 12 and 13 embodiment, flange 116 is rectangular in cross-section and gradually decreases in area as flange 116 extends downwardly from lower end 114, although this is not necessary. Flange 116 can have any geometric shape provided flange 116 is configured to deliver water from body 110 to reservoir 130 without leaking from system 100. For example, in some embodiments, flange 116 may be circular or otherwise round in cross-section.

Reservoir 130 is configured to retain a predetermined volume of water for feeding the plant(s) in pots 120. The amount of minerals and/or nutrients added to the water supplied to reservoir 130 (or through existing plumbing/water systems) may be selected depending on the maturity and/or type of plant(s) fed. In the FIG. 8 embodiment, reservoir 130 is rectangular in cross-section, although this is not necessary. Persons skilled in the art will recognize that reservoir 130 can have any shape, size, and configuration for supporting body 110 and providing water to the plant(s) in pots 120. For example, reservoir 130 may have a semicircular cross section defined by a curved front surface attached at opposite ends to a flat rear surface. A flat rear surface permits reservoir 130 to sit flush with a flat, vertical wall when system 100 is mounted in an upright, vertical position to the wall. Alternatively, reservoir 130 may have a circular cross-section and, to support system 100 in an upright, vertical position, system 100 may be supported from an above surface and/or supported on the ground or other flat surface below system 100 using a stand (not shown). In the FIG. 8 embodiment, reservoir 130 includes a spout 134 for emptying reservoir 130 and/or adding liquids to reservoir 130. In some embodiments, each tier 112 of body 110 overhangs or outwardly extends beyond spout 132 such that any plant matter falling from the plant(s) in pots 120 is minimized from falling into spout 132. In some embodiments, reservoir 130 includes a lip 132A at upper end 132 extending rearwardly from spout 134 to catch any water that may leak from body 110. In some embodiments, reservoir 130 includes a drain (not shown) for emptying reservoir 130.

To keep system 100 substantially free of external containments and debris, an upper end 117 of body 110 may be provided with a removable lid 190. In some embodiments, a seal (not shown) is provided between upper end 117 and lid 190 to fluidly seal body 110 and lid 190 together.

One or more of body 110, pots 120, reservoir 130, and lid 190 may be made of plastic or any other light, durable, and inexpensive material conventionally known. In some embodiments, one or more of body 110, pots 120, reservoir 130, and lid 190 is comprised of ABS plastic. In some embodiments, one or more of body 110, pots 120, reservoir 130, and lid 190 are formed via one or more of vacuum forming, roto-molding, injection molding, twin forming, and three-dimensional (3D) printing. In some embodiments, one or more of body 110, pots 120, reservoir 130, and lid 190 is integrally formed as one piece.

To keep the water inside reservoir 130 and the plant(s) inside pots 120 healthy, the water inside reservoir 130 should be changed regularly. For example, in some embodiments, the water should be changed once per week. The water may be drained from reservoir 130 by opening the drain (not shown) located in a lower end 138 of reservoir 130. Alternatively, the water may be poured from reservoir 130 using spout 134. To pour water from reservoir 130, reservoir 130 may be first removed from body 110. A pump 170 (as described below) should be turned off when water is absent from reservoir 130 or an insufficient amount of water is available to cover pump 170. Water may be added to reservoir 130 via spout 134 when reservoir 130 is attached to body 110.

Figure 14:
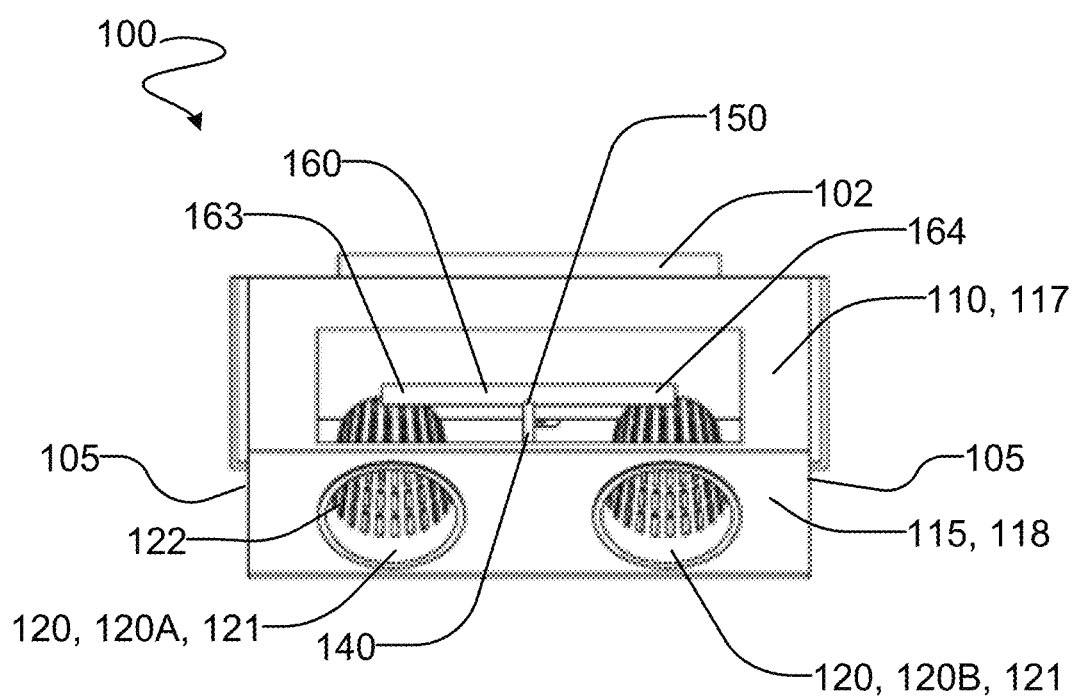
FIG. 14 is a top view of the FIG. 8 vertical hydroponics system, wherein the system is open to the external environment at an upper surface thereof.
Figure 15:
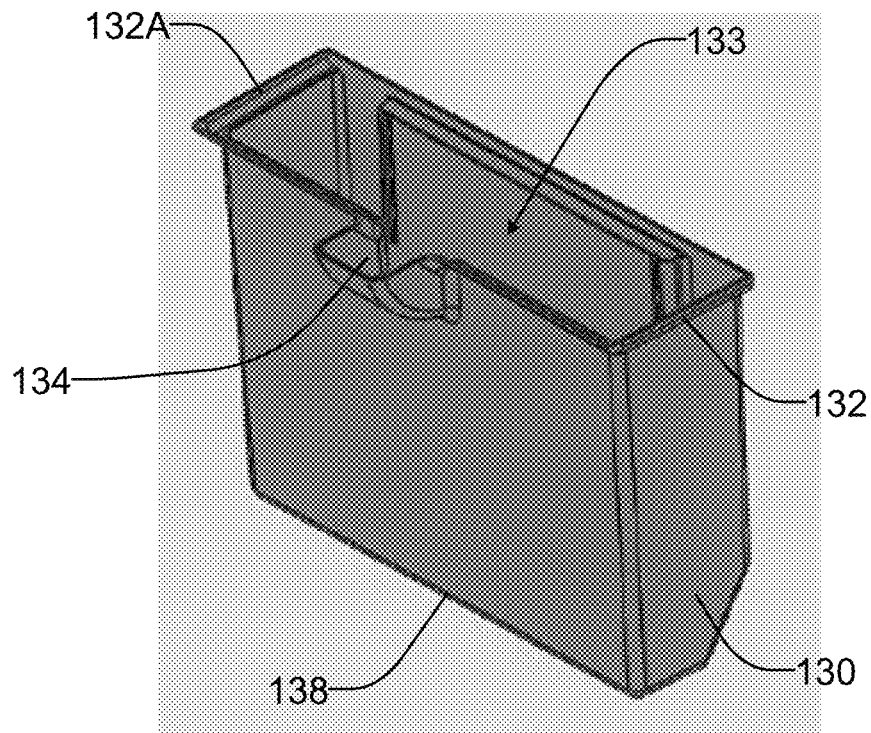
FIG. 15 is a front, top, right side perspective view of a reservoir of the FIG. 8 vertical hydroponics system.
Figure 16:
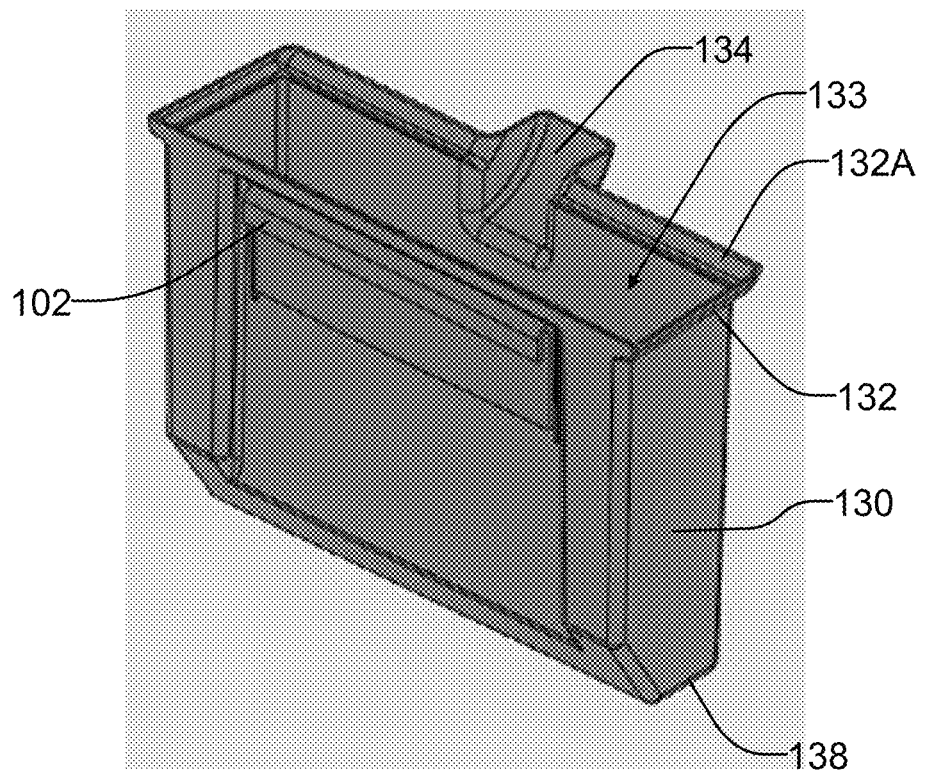
FIG. 16 is rear, top, right side perspective view of the FIG. 15 reservoir.
Figure 17:
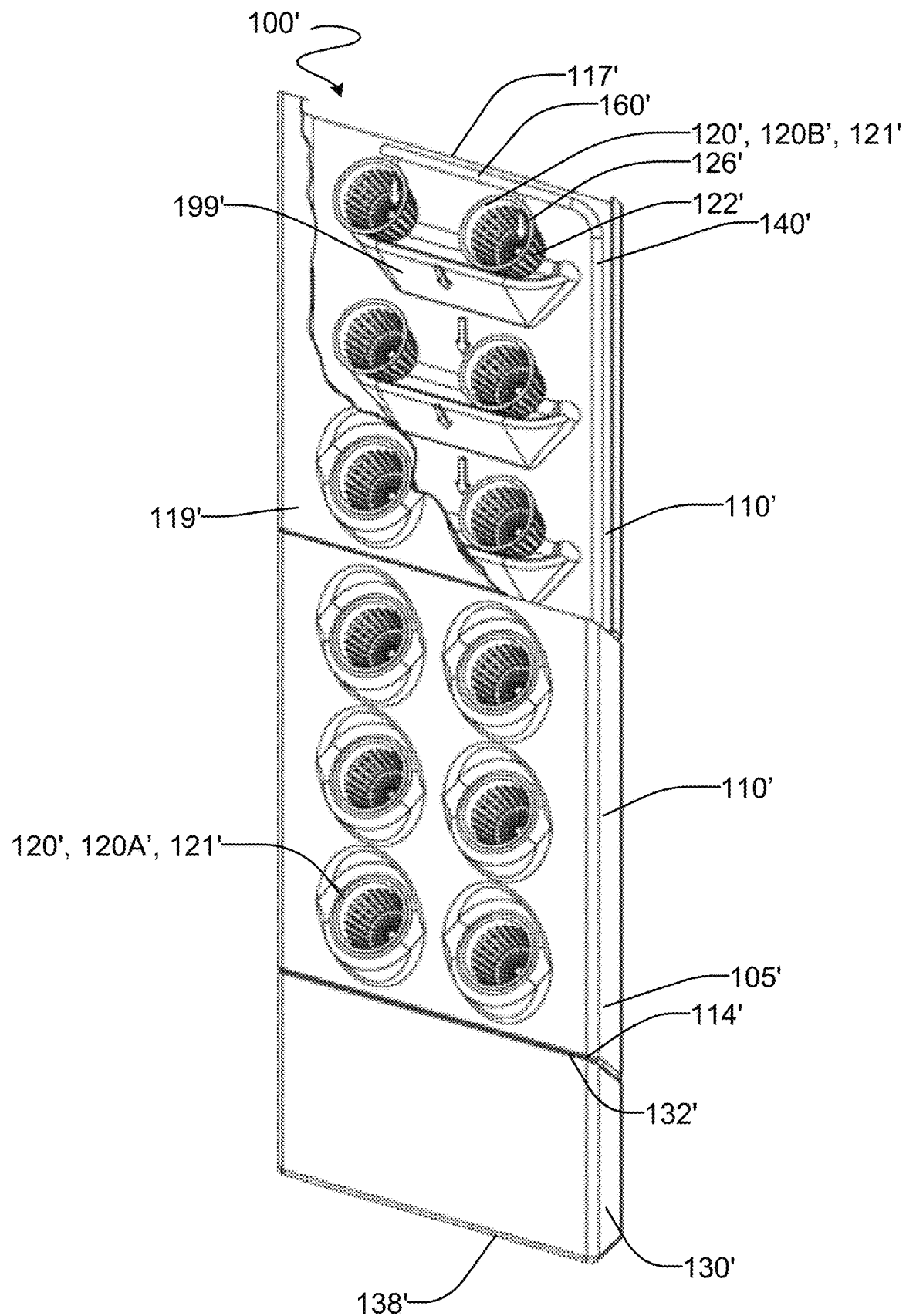
FIG. 17 is a front, top, right side perspective view of an example embodiment of the present invention, wherein the system is partially cut-away to show an inside of an upper module 120'.
Figure 18:
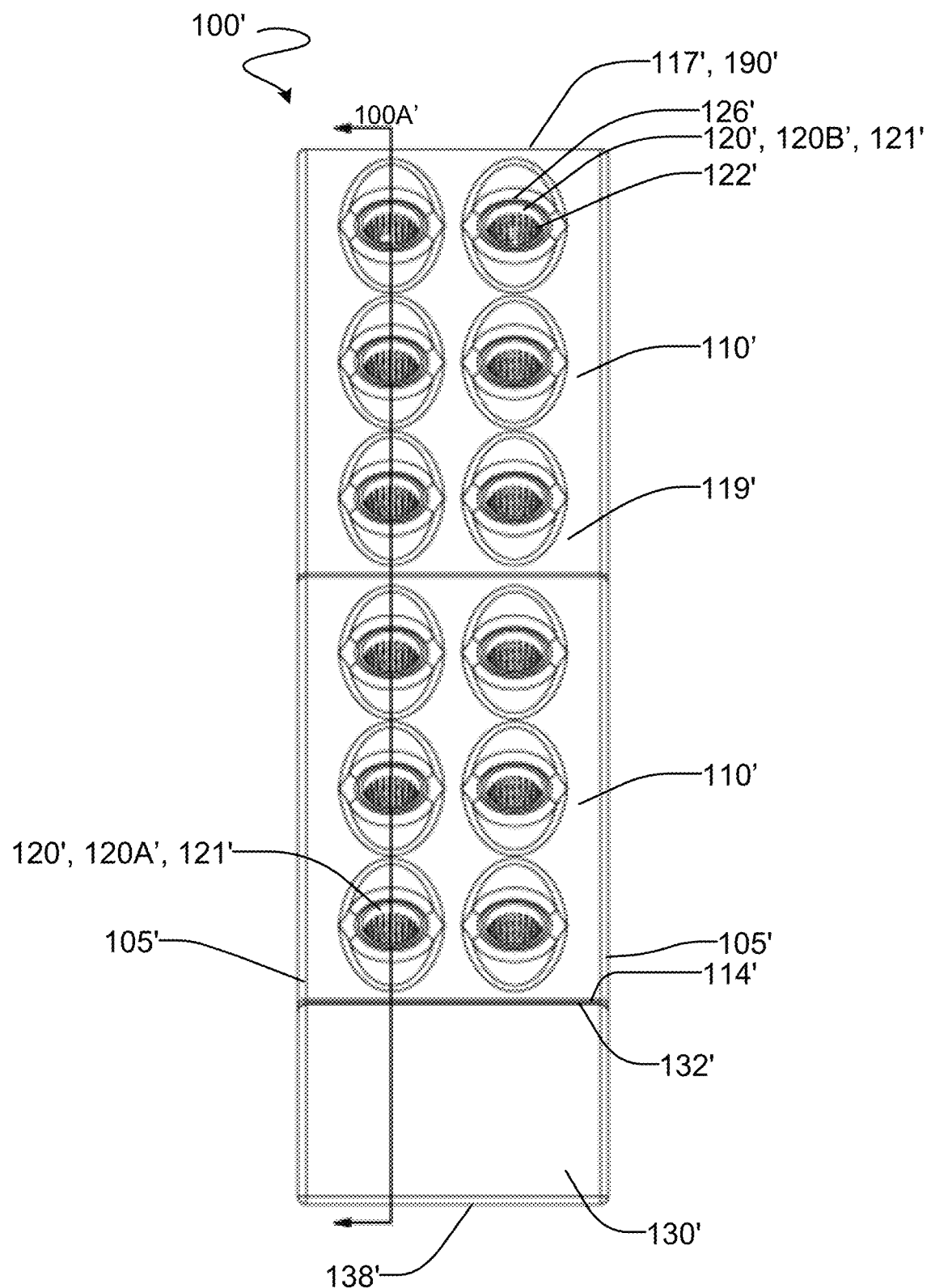
FIG. 18 is a front elevation view of the FIG. 17 vertical hydroponics system.
Figure 19:
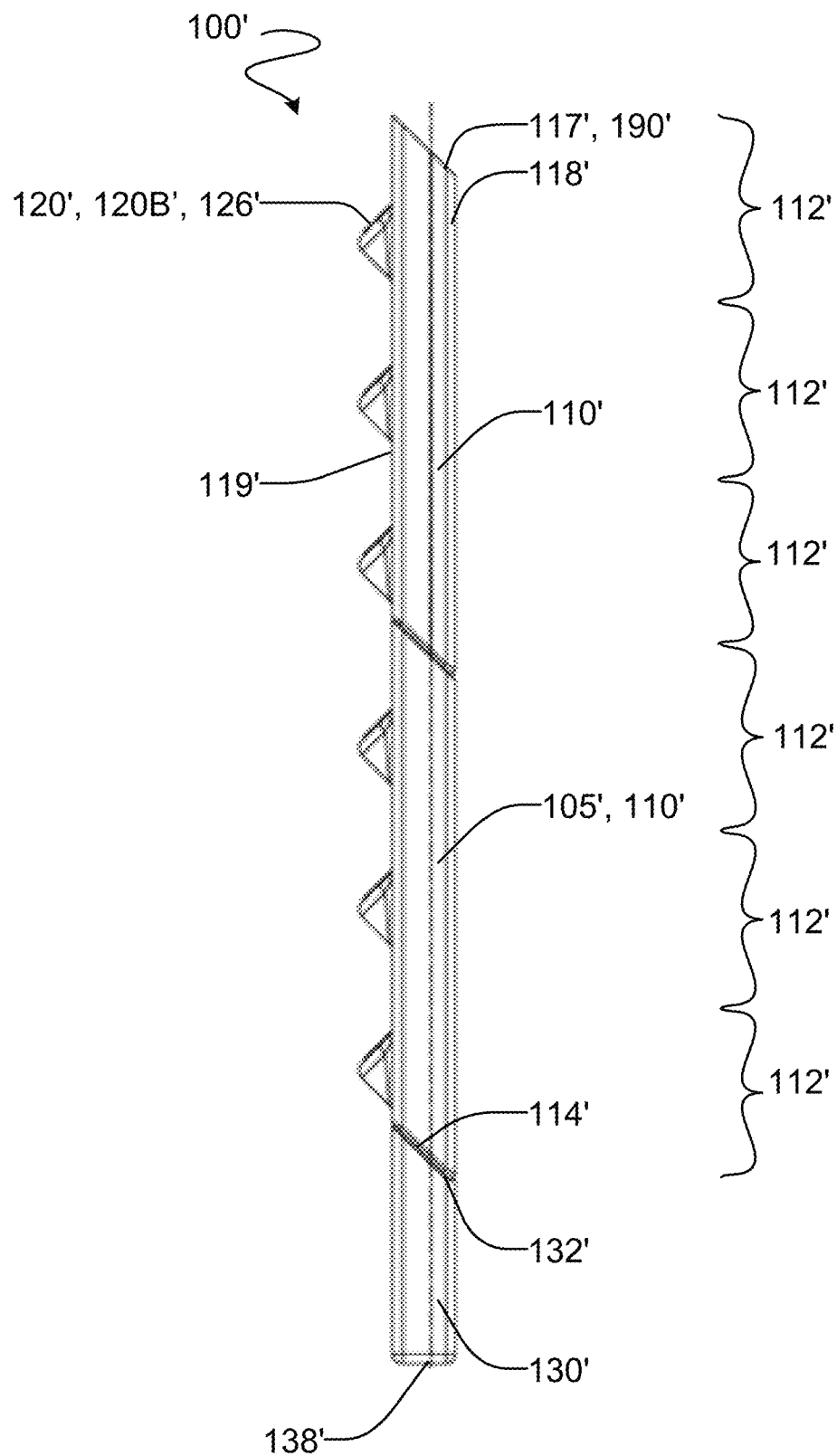
FIG. 19 a side elevation view of the FIG. 17 vertical hydroponics system.

To feed water from reservoir 130 uniformly to the plant(s) in pots 120, system 100 includes an irrigation tube 140 and pump 170 (FIG. 13). A first end 142 of irrigation tube 140 is submerged in the water in reservoir 130. Tube 140 extends through the inside of body 110 from reservoir 130 to the uppermost tier 112 of body 110 at around upper, surface 115A of the rear surface 118A. In the FIG. 13 embodiment, tube 140 extends through body 110 between the first column of pots 120A and the second column of pots 120B (not shown). Water is pumped from first end 142 of irrigation tube 140 to a second end 144 of irrigation tube 140 using pump 170 inside reservoir 130. Pump 170 may be any (conventionally known) water pump which is capable of feeding water from reservoir 130 to the plant(s) in the uppermost tier 112 of body 110. A larger pump 170 may be required if system 100 requires more water (for example, the plants require more water and/or body 110 of system 100 contains multiple tiers and/or multiple pots 120 in each tier) and/or the distance between first end 142 and second end 144 of tube 140 is large. In some embodiments, a T-fitting 150 is attached to second end 144 of irrigation tube 140 to split tube 140 into two or more supply tubes 160 (FIG. 14). Each supply tube 160 feeds water from tube 140 to a column of pots 120. In the FIG. 14 embodiment, irrigation tube 140 is split into two supply tubes 162, 164 using T-fitting 150. Supply tube 162 is used to feed the plant(s) in the first column of pots 120A and supply tube 164 is used to feed the plant(s) in the second column of pots 120B with water. In some embodiments, tube 140 extends across upper surface 117 of body 110 and defines apertures (not shown), each aperture aligned with a corresponding column of pots 120 such that water is delivered from reservoir 130 uniformly to the plant(s) in pots 120 of system 100 via tube 140. The flow rate or pressure of the water exiting the apertures may be determined from the size of the apertures.

As best seen in FIG. 13, water exits irrigation tube 140 and/or supply tubes 162, 164 at a rear inside surface 118 of body 110. Water flows downwardly along rear inside surface 118 and through apertures 122 of pots 120, thereby saturating the roots of the plant(s) inside pots 120 with water. In some embodiments, water passes through only the lower half (in height or volume) of each pot 120. In some embodiments, water passes through only the lower third (in height or volume) of each pot 120. Due to the adhesive and cohesive properties of water, water exiting each pot 120 may flow downwardly along inside rear surface 118 of body 110 as indicated by arrow 182 and/or downwardly along an inside front surface 119 of body 110 as indicated by arrow 184. To reduce water from leaking from system 100, front surface 119 is provided with a paddle 180 below each pot 120. Each paddle 180 is configured to redirect water from front surface 119 to rear surface 118 as indicated by arrow 184 (as seen in FIG. 12). In the absence of paddles 180, water may leak from the front of system 100. In the FIGS. 12 and 13 embodiment, each paddle 180 extends inwardly from front surface 119 of body 110 such that paddle 180 extends in the same plane as lower front surface 113 of each tier 112 of body 110. In some embodiments, each paddle 180 defines an aperture (not shown) between each pair of adjacent columns of pots 120 for tube 140 to pass through inside body 110. Each paddle 180 is configured such that water flows only through a lower portion of each pot 120 and is reduced from collecting around an outer rim 126 of pots 120 and leaking from system 100. In some embodiments, the lower portion of each pot 120 is the lower half (in height or volume) of pot 120. In some embodiments, the lower portion of each pot 120 is the lower third (in height or volume) of pot 120. Persons skilled in the art will recognize that, to reduce leaking, the lower portion of each pot 120 may be defined by the angle $\alpha$ of front surface 111 (and the corresponding angle $\alpha$ of pots 120) and/or the flow rate or pressure of water through system 100. For example, to reduce leaking, the lower portion of a pot of a tier having a front surface with an angle $\alpha$ greater than 45° will be smaller in height and/or volume than the lower portion of a pot of a tier having a front surface with an angle $\alpha$ less than 45°. Similarly, to reduce leaking, the lower portion of a pot of a system with relatively high water flow rate or pressure will be smaller in height and/or volume than the lower portion of a pot of system with relatively low water flow rate or pressure.

Since water is introduced to body 110 at the uppermost tier 112 of body 110 and cascades downwardly through body 110 in a serpentine path as described elsewhere herein, the flow rate or pressure of the water supplied to the plant(s) in pots 120 at the uppermost tier 112 of body 110 is substantially equivalent to the flow rate or pressure of the water supplied to the plant(s) in each pot 120 below the pots 120 in the uppermost tier 112. In other words, the flow rate or pressure of the water received by the plants in each pot 120 is substantially equivalent throughout body 110. Thus, the flow rate or pressure of the water flowing through irrigation tube 140 and/or supply tubes 160 can be maintained at such an amount to reduce minerals, nutrients, and/or other materials present in the water from building-up and clogging tubes 140 and/or 160. Accordingly, clogging and/or leaking of system 100 is minimized. Since the water inside system 100 is not stagnant and is circulated through system 100, the water is oxygenated as it flows downwardly through body 110, thereby supplying the plant(s) inside pots 120 with oxygen. Persons skilled in the art will recognize that the flow rate or pressure of water through system 100 may depend on one or more of the following: the size of system 100, the size of the plant(s) in pots 120, the number of plants in pots 120, the type of plants in pots 120, the size of pots 120, the type/absorbency of inert material in pots 120, how much water is absorbed by the plant(s) in pots 120, the height of system 100, the size/capacity of pump 170, the diameter of irrigation tube 140, the length of irrigation tube 140, the diameter of supply tubes 160, and the length of supply tubes 160.

Figure 8:
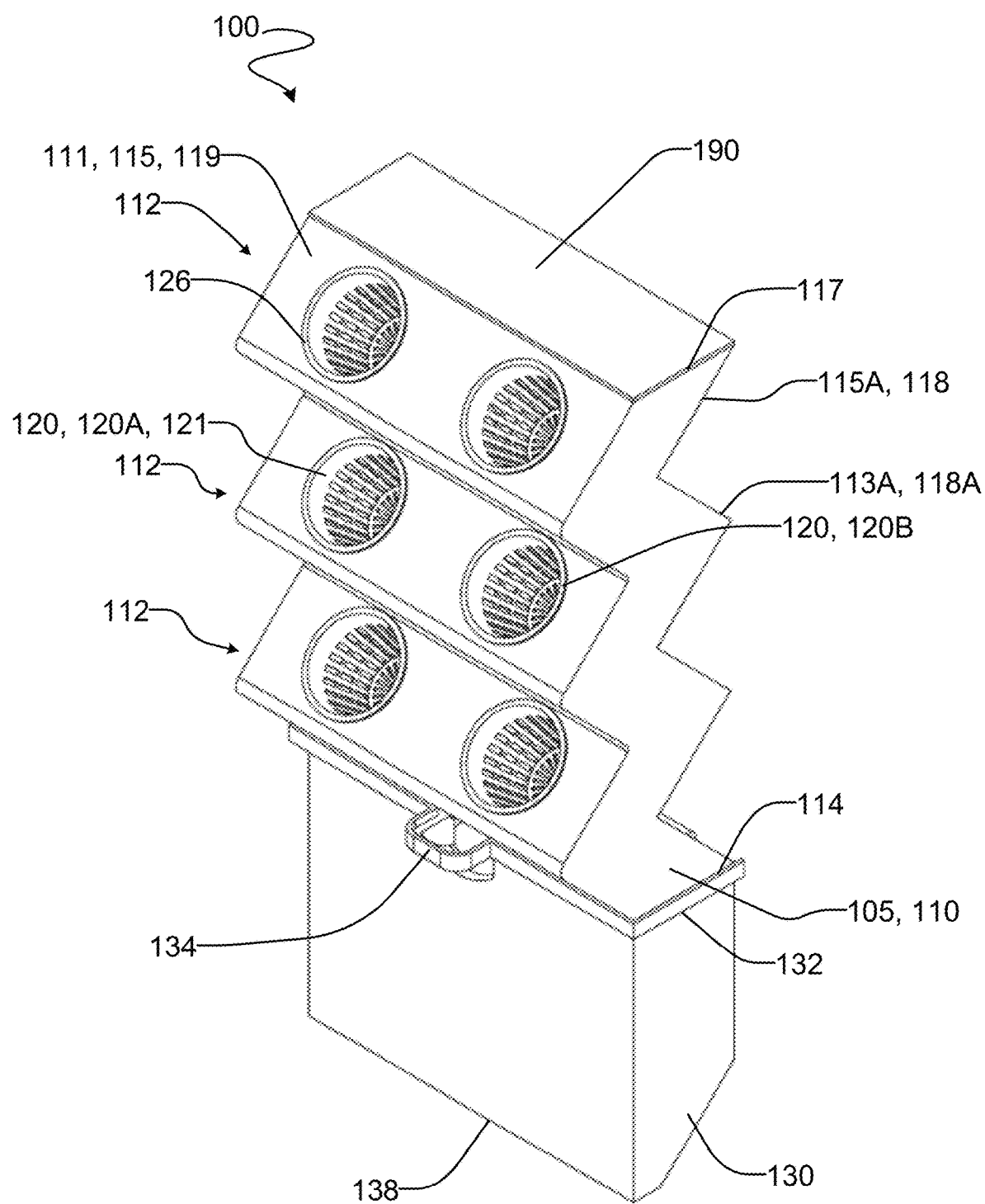
FIG. 8 is a front, top, right side perspective view of a vertical hydroponics system according to an example embodiment of the present invention.
Figure 9:
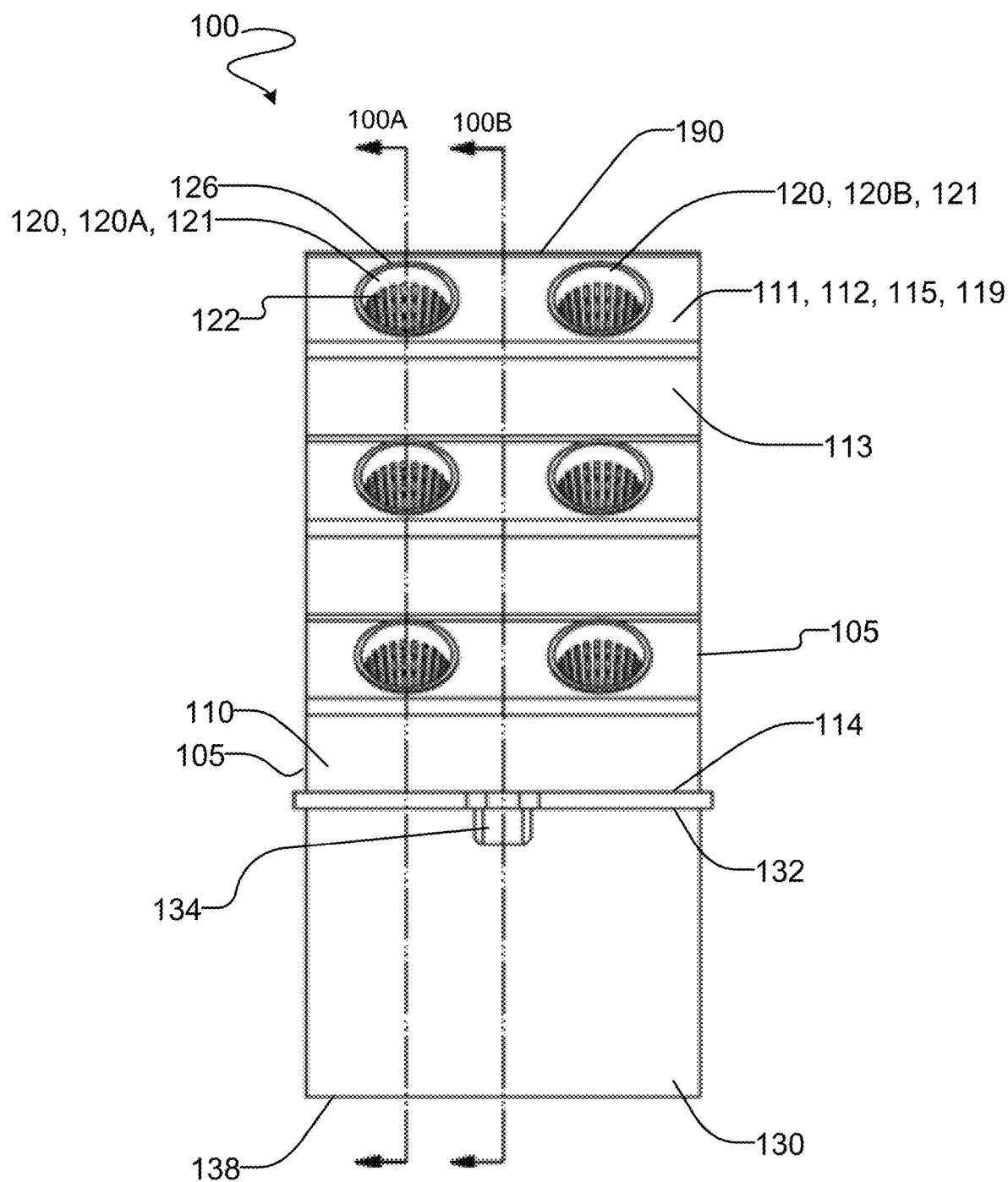
FIG. 9 is a front elevation view of the FIG. 8 vertical hydroponics system.
Figure 10:
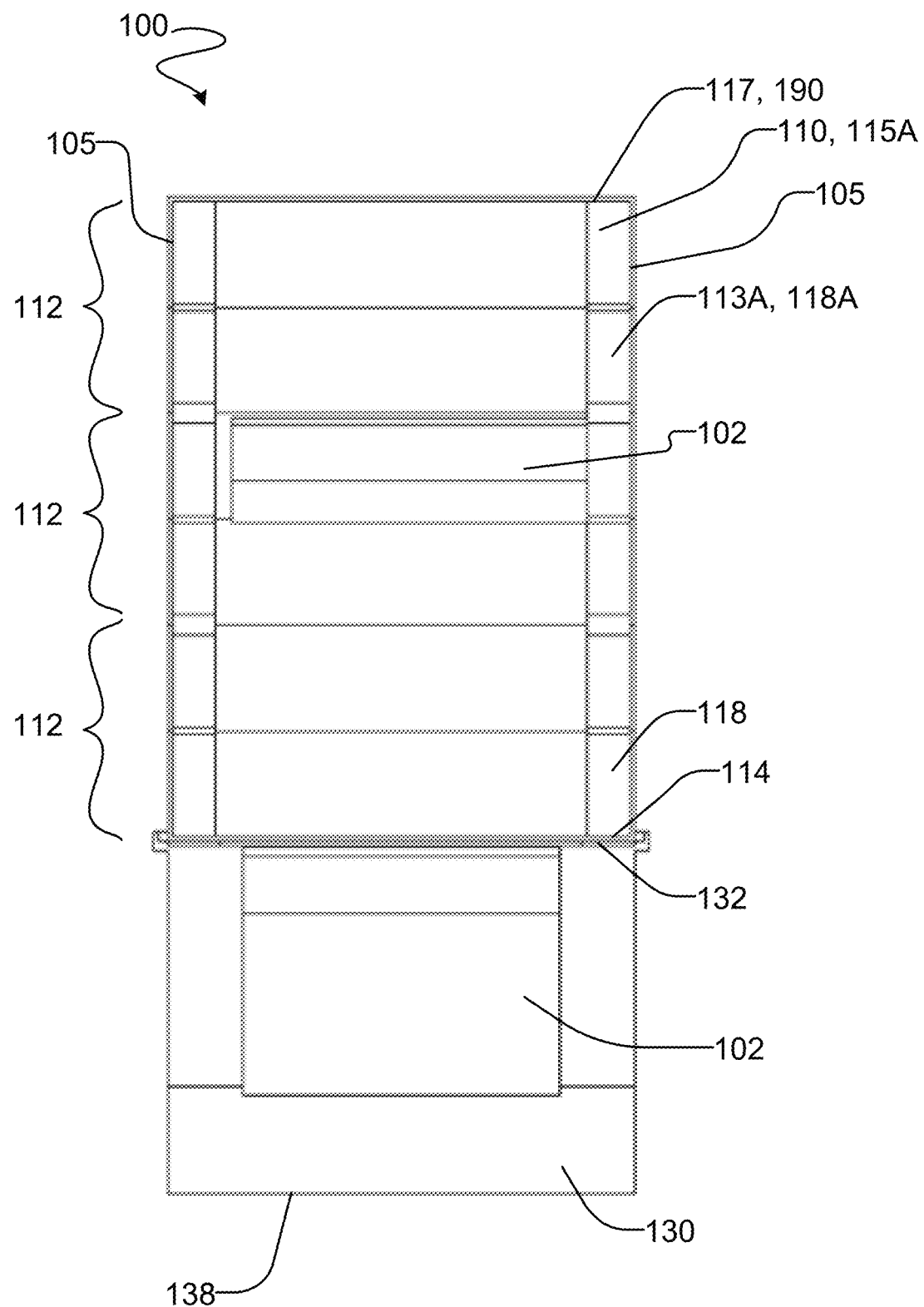
FIG. 10 is a rear elevation view of the FIG. 8 vertical hydroponics system.
Figure 20:
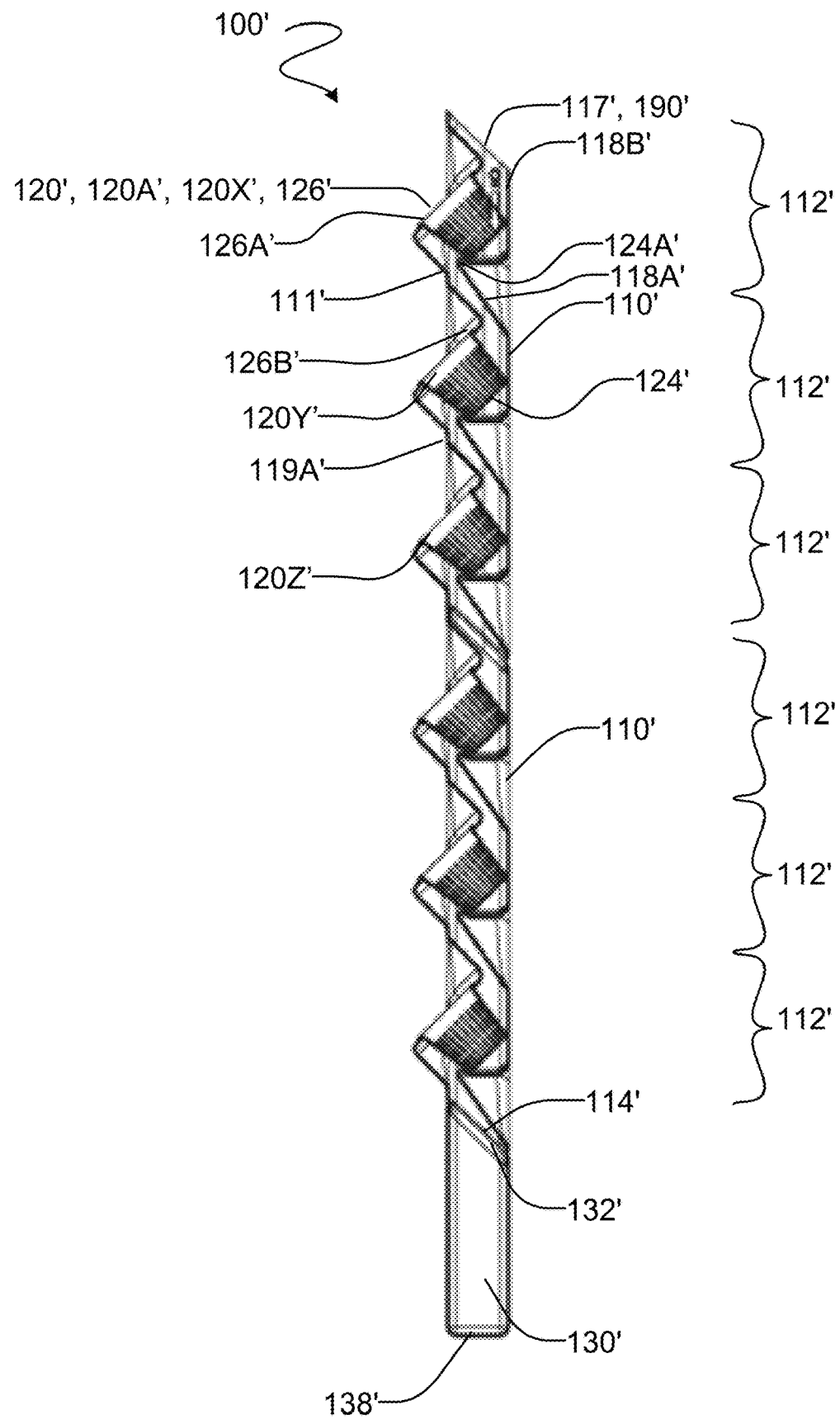
FIG. 20 is a cross-sectional view of the FIG. 17 vertical hydroponics system along the line designated as 100A' in FIG. 18.
Figure 21:
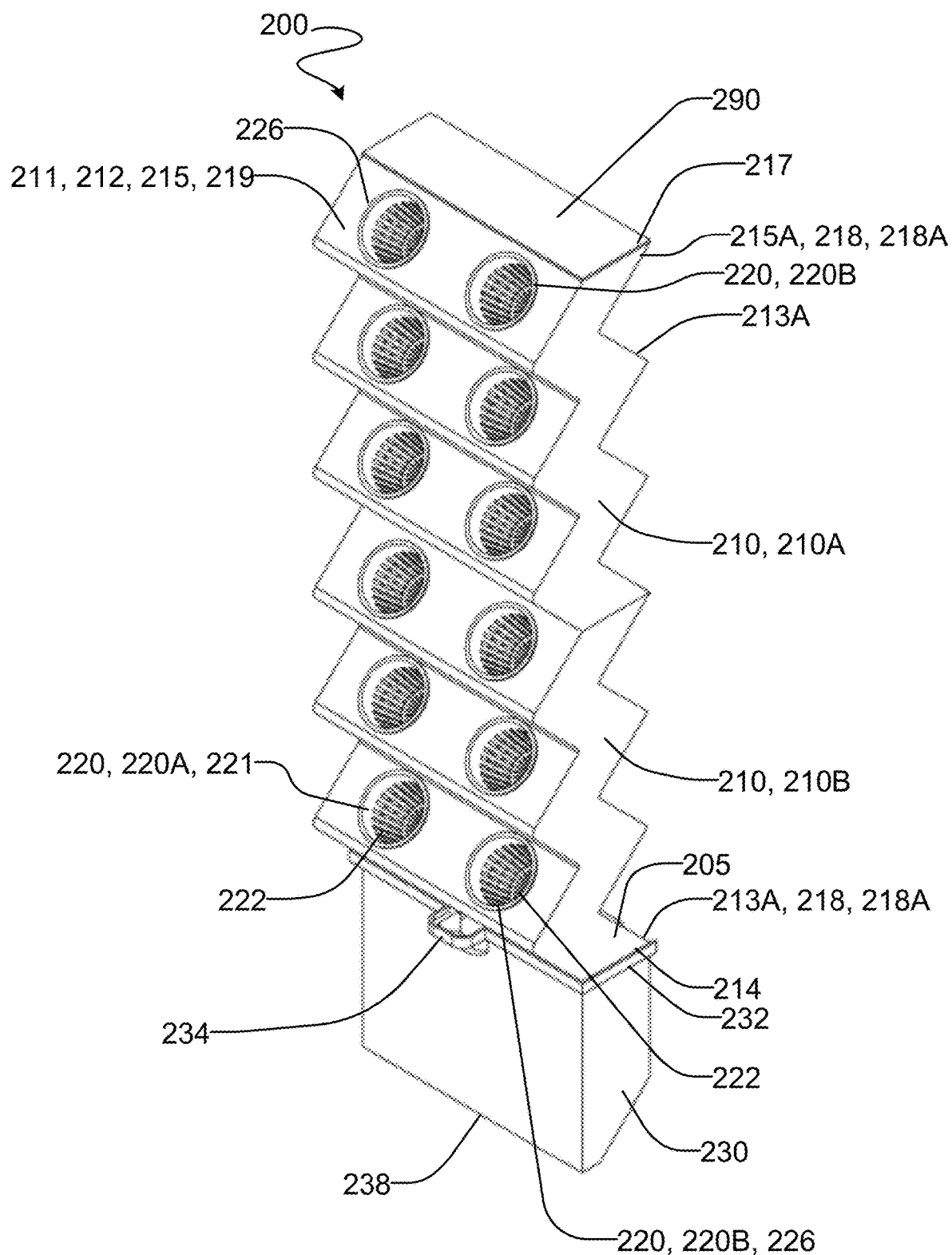
FIG. 21 is front, top, right side perspective view of a modular vertical hydroponics system according to an example embodiment of the present invention.
Figure 22:
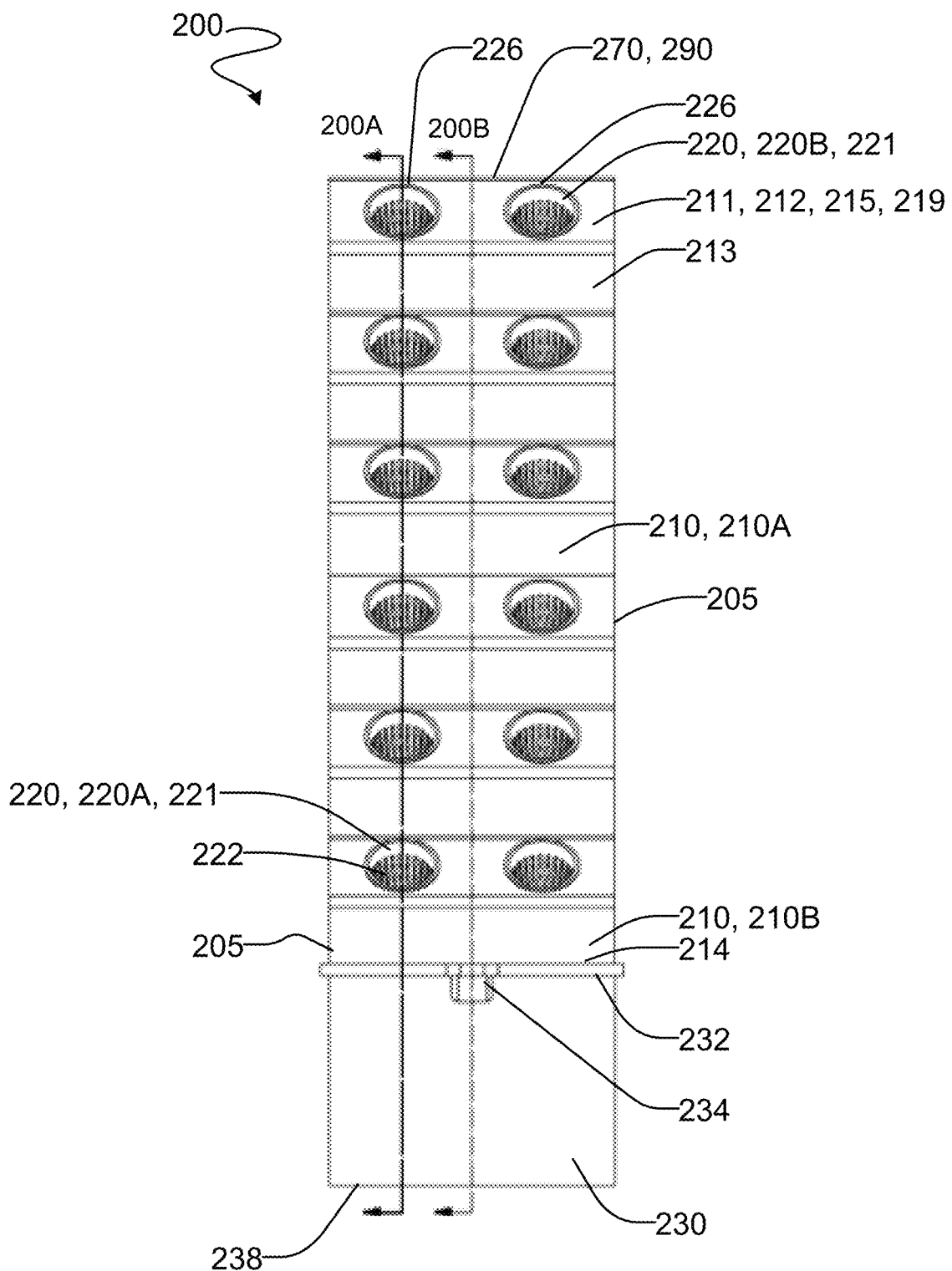
FIG. 22 is a front elevation view of the FIG. 21 modular vertical hydroponics system.
Figure 23:
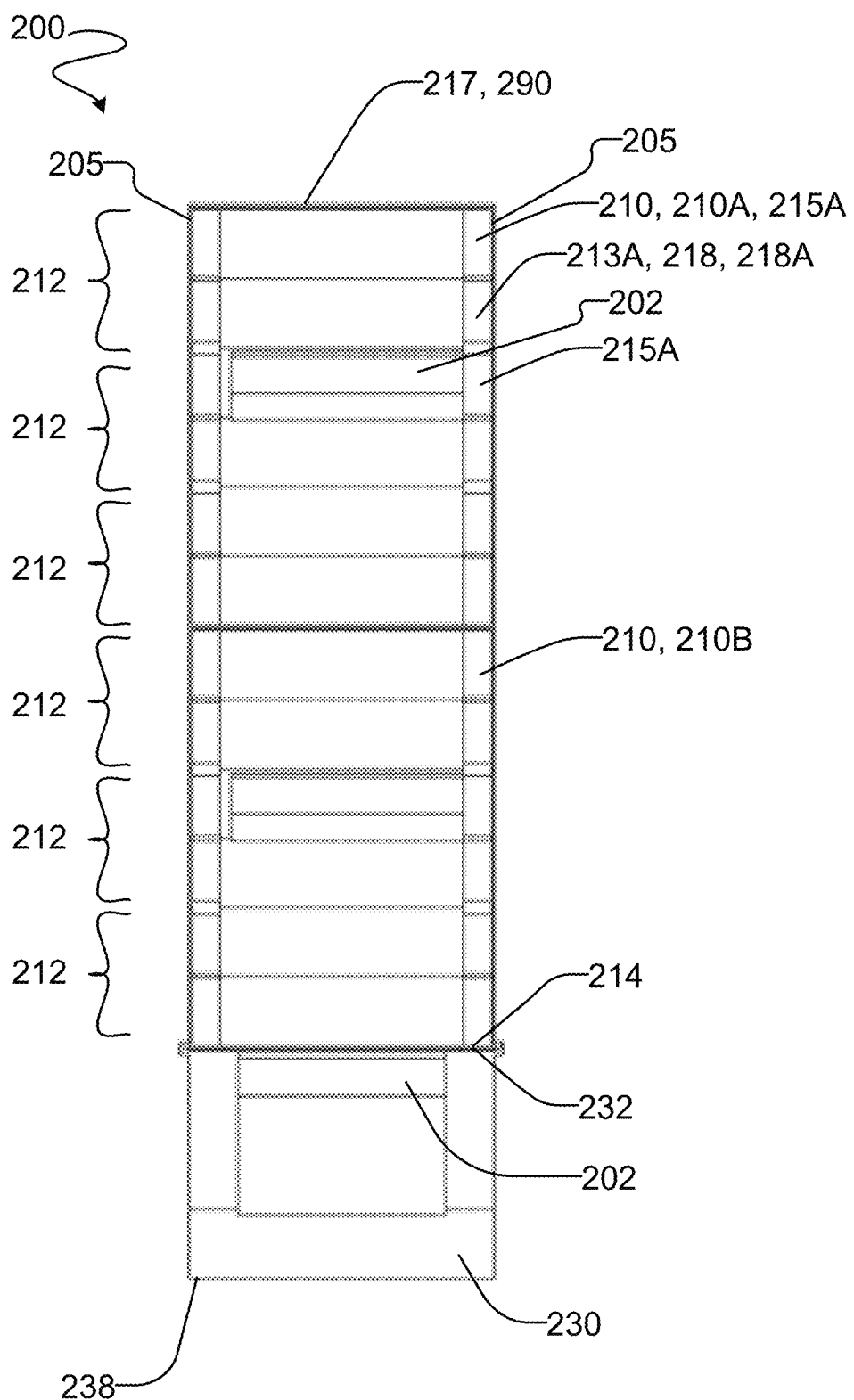
FIG. 23 is a rear elevation view of the FIG. 21 modular vertical hydroponics system.

In the FIG. 8 embodiment, tiers 112 of body 110 are rectangular in cross-section to achieve the cascade water flow described elsewhere herein. However, this is not necessary, and persons skilled in the art will recognize that tiers 112 and/or body 110 can have other shapes, sizes, and configurations for supporting plants in pots 120 provided the flow rate or pressure of the water passing through system 100 is uniform throughout the system and leaking is avoided. An example embodiment of a vertical hydroponics system 100' having curved tiers 112' and a curved body 110' is shown in FIGS. 17-20. System 100' is modular and vertically stackable, as described elsewhere herein. Many features and components of system 100 are similar to features and components of system 100, with the same reference numerals followed by the symbol to indicate features of system 100' that are similar to those of system 100. A significant difference between system 100' and system 100 is that system 100' lacks paddles for redirecting water from front surface 119A' to rear surface 118A', To redirect water away from the front of system 100', body 110' (and each tier 112') is configured such that water flows only through a lower portion of each pot 120' and is minimized from collecting around an outer rim 126' of pots 120' and leaking from system 100', In some embodiments, as best seen in FIG. 20, a curved front surface 111' of body 110' (and each tier 112') extends downwardly from a lower rim 126A' of an upper pot 120Y' towards, an upper rim 126B' of a lower pot 120Z'. A curved rear surface 118A' extends downwardly from a lower edge 124A' of an innermost surface 124' of an upper pot 120X' toward rear surface 118B' of body 110' behind pot 120Y'. In some embodiments, the lower portion of each pot 120' is the lower half (in height or volume) of pot 120'. In some embodiments, the lower portion of each pot 120' is the lower third (in height or volume) of pot 120'. Persons skilled in the art will recognize that, to reduce leaking, the lower portion of each pot 120' may be defined by the angle α' (not shown) of pots 120' and/or the flow rate or pressure of water through system 100'. For example, to reduce leaking, the lower portion of a pot of a tier having a front surface with a pot angle α' greater than 45° will be smaller in height and/or volume than the lower portion of a pot of a tier having a front surface with a pot angle α less than 45°. Similarly, to reduce leaking, the lower portion of a pot of a system with relatively high water flow rate or pressure will be smaller in height and/or volume than the lower portion of a pot of system with relatively low water flow rate or pressure. In some embodiments, pots 120' in a single tier 112' may be supported by a tray 199' (FIG. 17) inside body 110'. Tray 199' is configured so that water flow through body 110', as describe elsewhere herein, is not impeded and/or redirected. In some embodiments, tray 199' catches any water that may leak from rim 126' of pots 120'.

In some embodiments, to maintain a sufficient flow rate or pressure of the water travelling through tubes 140 and/or 160 and to reduce clogging, the diameter of tubes 140 and/or 160 is about ¼ " (i.e. about 0.64 centimeters), although this is not necessary. Persons skilled in the art will recognize that the diameter of tubes 140, 160 may be any diameter that meets the gallons per minute (GPM) and/or the total dynamic head (TDH) of pump 170. Larger diameter tubes 140, 160 may be required if, for example, system 100 requires more water (for example, the plants require more water and/or body 110 of system 100 contains multiple tiers 112 and/or multiple pots 120 in each tier) and/or pump 170 is capable of pumping water at a higher flow rate/pressure and/or the distance between first end 142 and second end 144 of tube 140 is large and/or the distance between first end 142 of tube 140 and an outlet end of supply tubes 160 is large.

In some embodiments, pump 170 may be programmed to be turned on for one or more predetermined periods of time. For example, pump 170 may be programmed to be turned on for a period of 15 minutes and subsequently turned off for a period of 45 minutes each hour of each day for a predetermined length of time. Pump 170 may be manually controlled or automatically controlled using a controller (not shown). In some embodiments, the controller may be WIFI-enabled and compatible with mobile devices.

In some embodiments, system 100 includes at least one light (not shown), including, but not limited to, a light emission diode (LED) light. The light may be adjustable so that the distance between the light and the plant(s) in pots 120 and/or the direction that the light points can be modified to optimize the amount of light delivered to each plant. The light can be adjusted manually or it can be automatically adjusted using a controller (not shown). In some embodiments, the light may be programmed to be turned on for one or more predetermined periods of time. For example, light may be programmed to be turned on daily for a period of 12 hours and turned off daily for a period of 12 hours. The time settings of the light may be manually controlled or automatically controlled using the controller. In some embodiments, the controller may be WIFI-enabled and compatible with mobile devices.

In some embodiments, system 100 includes trellis tabs (not shown) to be used to trellis the plant(s) inside pots 120 to keep the plants healthy. In some embodiments, the tabs are removeably attached to lower surface 113 of each tier 112.

System 100 is a hydroponics system. However, this is not necessary, and persons skilled in the art will recognize that system 100 can be adapted to use soil to support the plant(s) in pots 120 or to suspend the plant(s) in water in pots 120. Thus, system 100 can be adapted to provide a vertical soil system, a vertical hybrid soil/hydroponics system, and/or a vertical deep water culture system. To defend against soil clogging system 100, pump 170 may be provided with one or more of a filter, mesh, and screen.

Figure 24:
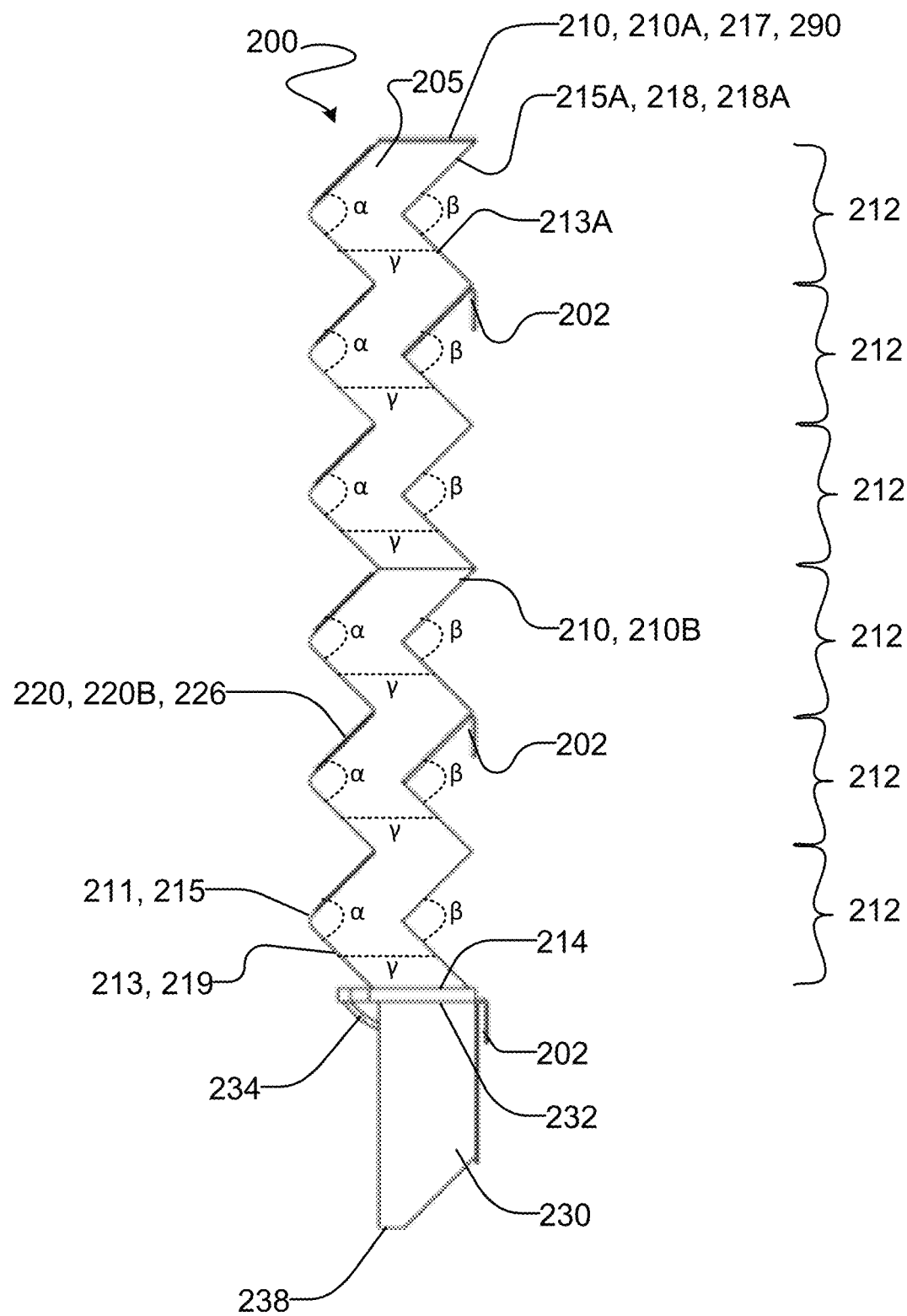
FIG. 24 is a side elevation view of the FIG. 21 modular vertical hydroponics system.
Figure 25:
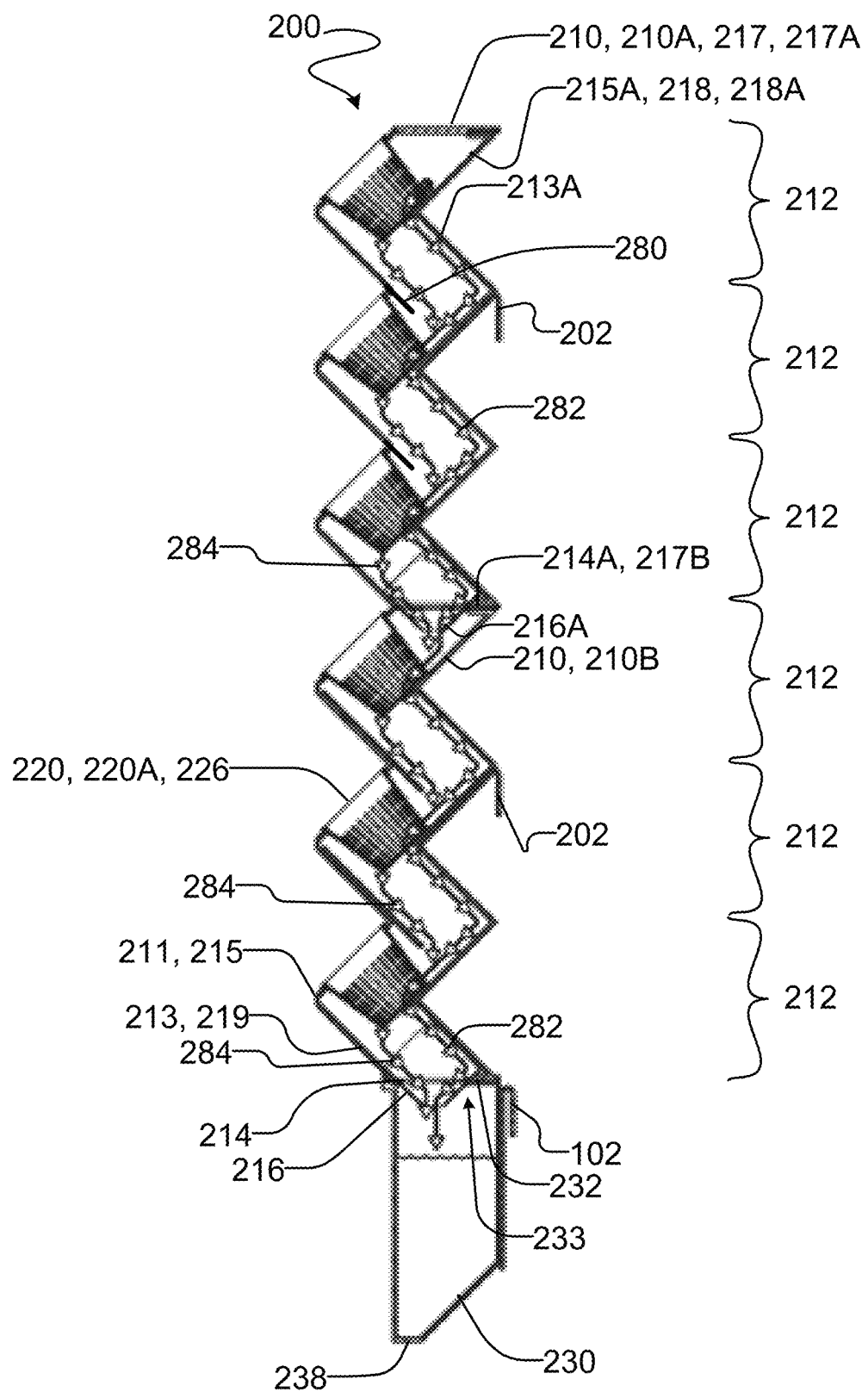
FIG. 25 is a cross-sectional view of the FIG. 21 modular vertical hydroponics system along the line designated as 300A in FIG. 22.
Figure 26:
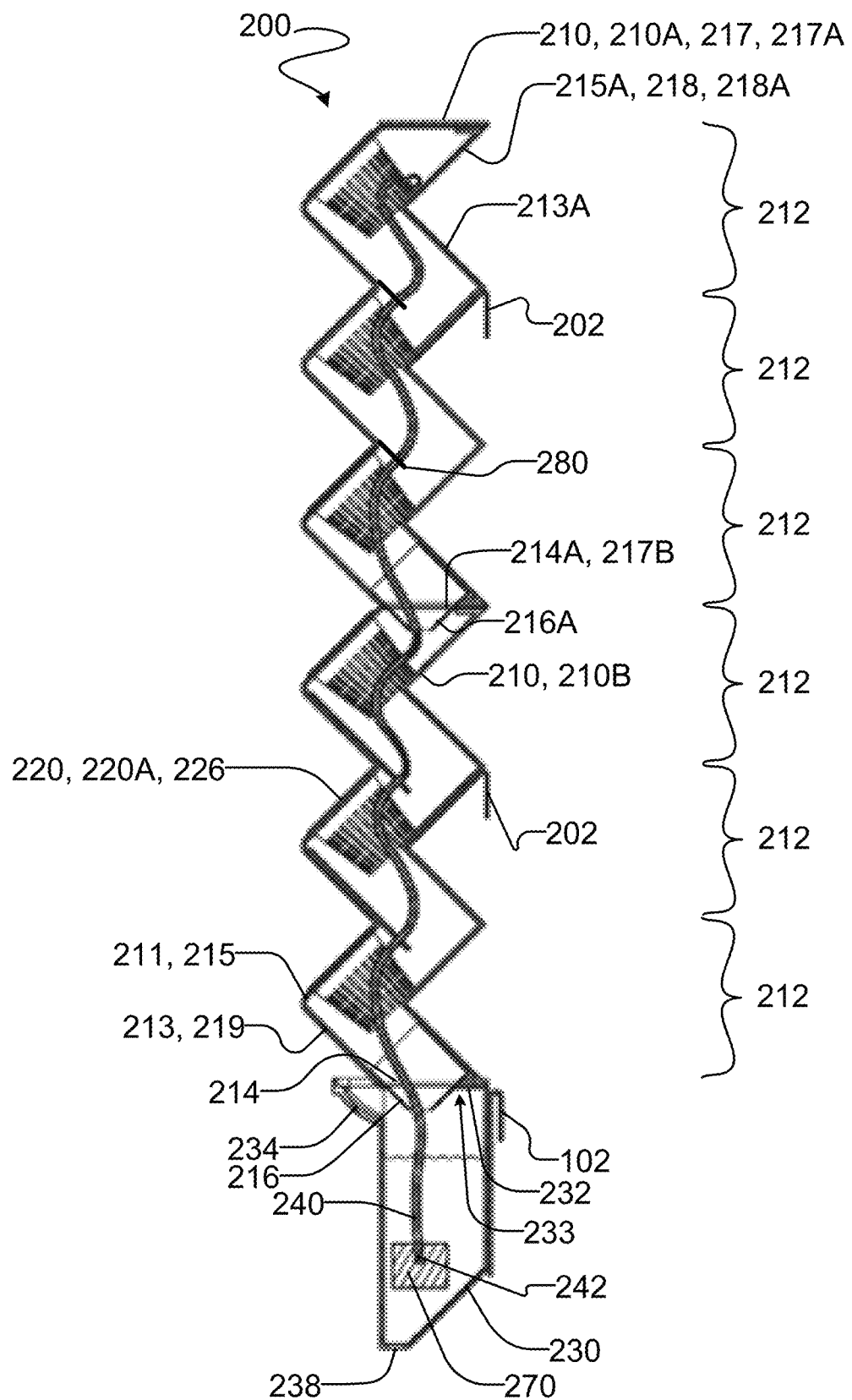
FIG. 26 is a cross-sectional view of the FIG. 21 modular vertical hydroponics system along the line designated as 300B in FIG. 22.

In some embodiments, system 100 is modular and comprises multiple bodies 110 stacked vertically and/or horizontally. An example embodiment of a vertically-stackable, modular hydroponics system 200 is shown in FIGS. 21-26. Many features and components of system 200 are similar to features and components of system 100, with the same reference numerals used, albeit in the "200" series instead of the "100" series, to indicate features of system 200 that are similar to those of system 100. In the embodiment illustrated in FIGS. 21-26, system 200 includes two vertically-stackable bodies 210, although this is not necessary. Persons skilled in the art will understand that system 200 may include any practical number of vertically-stackable bodies 210. To vertically stack bodies 210, an upper body 210A includes a flange 216A extending downwardly from a lower end 214A thereof, as best seen in FIGS. 24 and 25. Flange 216A is substantially identical to flange 216. Flange 216A is configured to sit inside an opening 211A defined by an upper end 217B of a lower body 210B, abut against upper end 217B, and extend downwardly into body 210B to minimize leaking. In some embodiments, a seal (not shown) is provided between lower end 214A and upper end 217B to fluidly seal upper body 210A and lower body 210B together. In some embodiments, flange 216A tapers from lower end 114A of body 210A as flange 216A extends downwardly from body 210A. In this way, water travels from body 210A to body 210B through flange 216A without leaking. Water travelling from upper body 210A to lower body 210B through flange 216A is redirected from a front surface 119A of upper body 210A to a rear surface 118B as indicated by arrow 284. In the absence of flange 216A, water may leak from the front of system 200. Flange 216A is configured such that water flows only through a lower portion of the uppermost pot 220B of body 210B and is reduced from collecting around an outer rim 226 of pots 220 and leaking from system 200, as described elsewhere herein. In the FIGS. 25 and 26 embodiment, flange 216A is rectangular in cross-section and gradually decreases in area as flange 216A extends downwardly from lower end 214A of upper body 210A, although this is not necessary. Flange 216A can have any geometric shape provided flange 216A is configured to deliver water from upper body 210A to lower body 210B without leaking. For example, in some embodiments, flange 216A may be circular or otherwise round in cross-section.

Water is uniformly fed from reservoir 230 to the plant(s) in pots 220 of upper and lower bodies 210A, 210B, as described elsewhere herein. A first end 242 of an irrigation tube 240 is submerged in the water in reservoir 230. Tube 240 extends from reservoir 230 to an uppermost tier 212 of upper body 210A. Water is pumped from first end 242 of irrigation tube 240 to a second end 244 of irrigation tube 240 using pump 270 inside reservoir 230. To accommodate the height of vertically-stackable bodies 210, system 200 is provided with a pump 270 capable of delivering water from reservoir 230 to the uppermost tier 212 of upper body 210A. Tubes 240, 260 have diameters that are sufficient to meet the GPM and/or the TDH of pump 270 and/or the water demands of the plant(s) of system 200.

Figure 27:
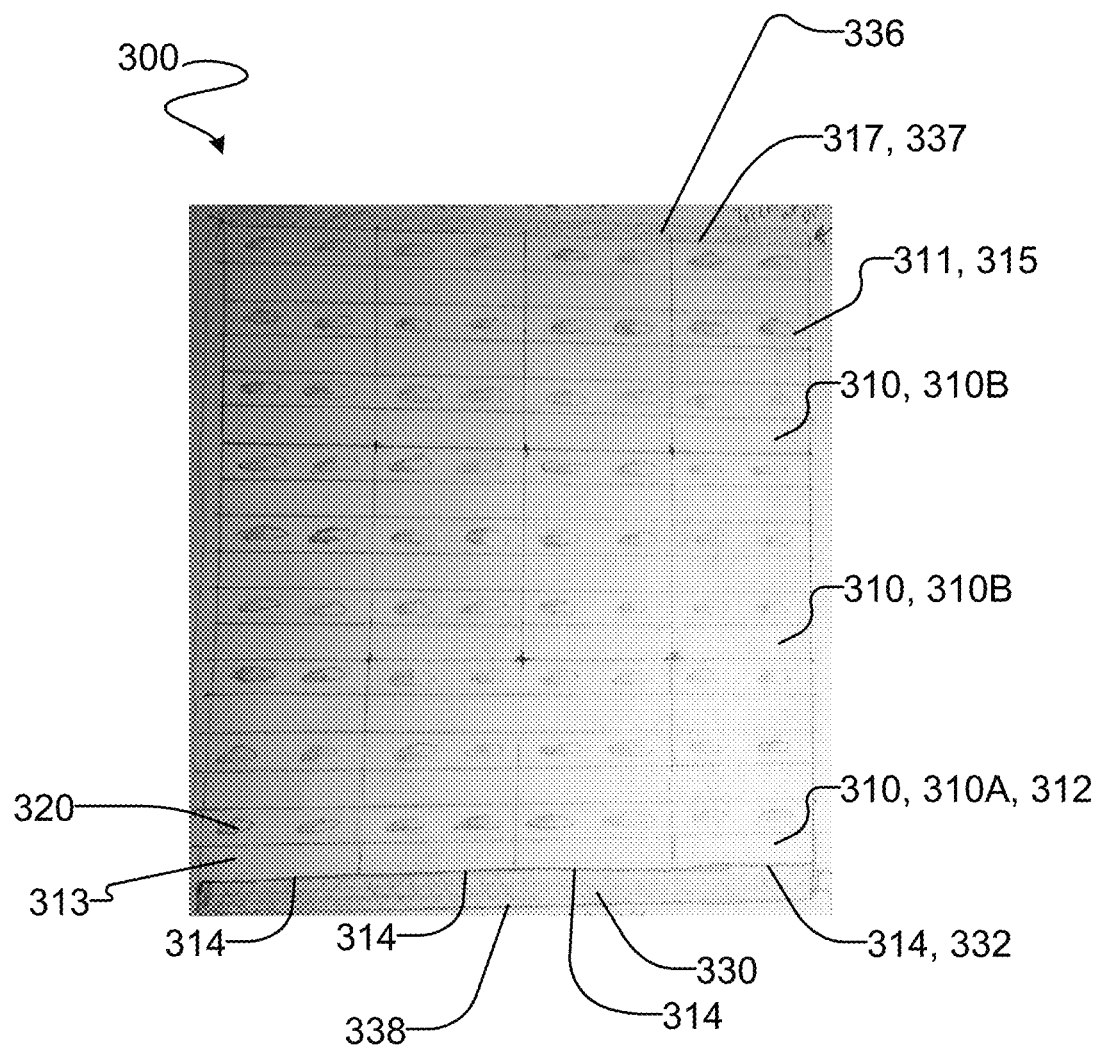
FIG. 27 is a front, top, right side perspective view of a modular vertical hydroponics system according to an example embodiment of the present invention.

An example embodiment of a horizontally- and vertically-stacked, modular hydroponics system 300 is shown in FIG. 27. Many features and components of system 300 are similar to features and components of systems 100, 200, with the same reference numerals used, albeit in the "300" series instead of the "100" or "200" series, to indicate features of system 300 that are similar to those of systems 100, 200. In the embodiment illustrated in FIG. 27, system 300 includes four horizontally-stackable bodies 310A (each having three tiers 312) and two vertically-stackable bodies 310B (each having three tiers 312) stacked to each horizontally-stackable body 310A, although this is not necessary. Persons skilled in the art will understand that system 300 may include any practical number of horizontally-stackable bodies 310A and/or vertically-stackable bodies 310B. Vertically-stackable bodies 310B are stacked as described elsewhere herein. To horizontally stack bodies 310A, reservoir 330 is configured to accommodate two or more bodies 310A in horizontal alignment therein and to retain a predetermined volume of water for feeding the plant(s) in pots 320 of bodies 310A, 310B. Bodies 310A are removeably attachable to reservoir 330 as described elsewhere herein. In some embodiments, a seal (not shown) is provided between each lower end 314 of bodies 310A and an upper end 332 of reservoir 330 to fluidly seal bodies 310B and reservoir 330 together. In some embodiments, system 300 is provided with clips (not shown) to fasten bodies 310A and/or bodies 310B together for stability. Each clip may be removeably fastened over adjacent sides of upper ends 317 of adjacent bodies 310A, 310B to secure adjacent bodies 310A and/or 310B together.

Water is uniformly fed from reservoir 330 to the plant(s) in pots 320 of bodies 310A, 310B, as described elsewhere herein. In some embodiments, an irrigation tube (not shown) is provided for each body 310A supported by reservoir 330. Alternatively, in some embodiments, a single irrigation tube may be provided for multiple bodies 310A. A first end of each irrigation tube is submerged in the water in reservoir 330. Each tube extends from reservoir 330 to an uppermost tier 312 of each column of bodies 310A, 310B. Water is pumped from the first end of each irrigation tube to a second end using one or more pumps (not shown) inside reservoir 330. In some embodiments, to accommodate multiple horizontally-stackable bodies 310A, a single tube is split into multiple supply tubes to feed each column of plants in pots 320 of multiple bodies 310A, 310B. System 300 is provided with a pump capable of delivering water from reservoir 330 to uppermost tier 312 of each column of bodies 310A, 310B. The irrigation and/or supply tubes have diameters that are sufficient to meet the GPM and/or the TDH of the pump and/or the water demands of the plant(s) of system 300.

In some embodiments, system 300 includes a lower reservoir 330 and an upper reservoir 336. In some embodiments, upper reservoir 336 is substantially identical to lower reservoir 330, however, upper reservoir 336 is configured to couple to an upper end 317 of one or more bodies 310. In some embodiments, a seal (not shown) is provided between upper end 317 of one or more bodies 310 and a lower end 337 of upper reservoir 336 to fluidly seal upper reservoir 336 and one or more bodies 310 together. In some embodiments, a tube (not shown) is used to pump water from lower reservoir 330 to upper reservoir 336. Alternatively, in some embodiments, upper reservoir 336 is supplied with water from an external source, such as, but not limited to, an existing plumbing/water system. In some embodiments, upper reservoir 336 is provided with one or more apertures (not shown) defined by lower end 337. Each aperture may align with a corresponding column of pots 320 such that water is delivered from reservoir 336 uniformly to the plant(s) in pots 320 of system 300. The flow rate or pressure of the water travelling from upper reservoir 336 to the plant(s) of system 300 may be determined from the amount of water inside upper reservoir 336 and/or the size of each aperture.

Persons skilled in the art will recognize that the hydroponics systems disclosed herein, including, but not limited to, system 100 and/or system 200, may include an upper reservoir that is substantially identical to reservoir 336 to deliver water uniformly to the plant(s) in the pots thereof. For example, where system 100 and/or system 200 includes an upper reservoir, tubes 140, 240 may be used to pump water from lower reservoirs 130, 230 to the upper reservoir. Alternatively, such systems may not require lower reservoirs 130, 230 as a water source and the upper reservoir may be supplied with water from an external source, such as, but not limited to, an existing plumbing/water system. Accordingly, such systems may lack tubes 140, 160, 240, 260 and rely exclusively on the upper reservoir for uniform water delivery to the plant(s) in pots 120, 220 of systems 100, 200.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

Interpretation of Terms

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Where a component (e.g. a body, tier, pot, reservoir, tube, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which perform the function in the illustrated exemplary embodiments described herein.

Specific examples of systems, methods, and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

What is claimed is:

1. A system for growing plants comprising:
   at least one body, each of the bodies configured to direct water away from a front surface of each of the bodies to reduce or prevent leaking and each of the bodies comprising one or more paddles, each paddle inwardly extending from an inside surface of the body and configured to direct water away from the front surface of the body, wherein the paddle extends in a plane coincident with a plane of the inside surface and wherein the paddle comprises a planar member;
   at least two vertically-stacked pots coupled to the front surface of the at least one body for supporting one or more plants, wherein at least one of the one or more paddles are provided below each of the pots; and
   a water source fluidly connected to each of the bodies for delivering water to each of the pots.

2. The system for growing plants according to claim 1, wherein each of the bodies is configured such that water flows only through a lower portion of each pot.

3. The system for growing plants according to claim 2, wherein the lower portion of each of the pots is the lower third in height or volume of the pot.

4. The system for growing plants according to claim 1, wherein each of the bodies comprises at least one V-shaped tier, each tier comprising a front surface attached to a rear surface by two side surfaces, the front surface having an upper surface adjoined to a lower surface at an angle $\alpha$ and the rear surface having an upper surface adjoined to a lower surface at an angle $\beta$.

5. The system for growing plants according to claim 4, wherein the angle $\alpha$ is between about 30° and about 60°.

6. The system for growing plants according to claim 4, wherein the angle $\alpha$ is about 45°.

7. The system for growing plants according to claim 4, wherein the angle $\beta$ is between about 30° and about 60°.

8. The system for growing plants according to claim 4, wherein the angle $\beta$ is about 45°.

9. The system for growing plants according to claim 1, wherein the water source comprises a lower reservoir removeably attachable to a lower end of a lowermost body.

10. The system for growing plants according to claim 1, wherein the water source comprises a preexisting plumbing or water system.

11. The system for growing plants according to claim 1, further comprising at least one irrigation tube extending from the water source to a rear, upper surface of the body.

12. The system for growing plants according to claim 1, wherein the water source comprises an upper reservoir removeably attachable to an uppermost body.

13. The system for growing plants according to claim 12, further comprising an irrigation tube for delivering water from a lower reservoir to the upper reservoir.

14. The system for growing plants according to claim 12, wherein at least one aperture is defined in the upper reservoir, each aperture aligned to deliver water from the rear, upper surface of the uppermost body to a column of the at least one pot.

15. The system for growing plants according to claim 1, wherein each of the bodies is vertically-stackable.

16. The system for growing plants according to claim 1, wherein each of the bodies is horizontally stackable.

17. The system for growing plants according to claim 1, further comprising a removable lid to close the system.

18. The system for growing plants according to claim 1, further comprising a pump for delivering water from the water source to an upper reservoir or to a rear, upper surface of an uppermost body.

19. The system for growing plants according to claim 18, further comprising a controller for manually or automatically programming the pump.

20. The system for growing plants according to claim 1, further comprising at least one light.

21. The system for growing plants according to claim 20, wherein a controller manually or automatically programs the at least one light.

* * * * *